United States Patent
Rajkumar et al.

(10) Patent No.: US 9,940,481 B2
(45) Date of Patent: *Apr. 10, 2018

(54) PRIVACY MANAGEMENT ACROSS MULTIPLE DEVICES

(71) Applicant: Google Inc., Mountain View, CA (US)

(72) Inventors: Nareshkumar Rajkumar, San Jose, CA (US); Vinod Kumar Ramachandran, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/199,557

(22) Filed: Jun. 30, 2016

(65) Prior Publication Data

US 2017/0017804 A1 Jan. 19, 2017

Related U.S. Application Data

(63) Continuation of application No. 14/641,768, filed on Mar. 9, 2015, now abandoned, which is a
(Continued)

(51) Int. Cl.
*G06F 3/00* (2006.01)
*G06F 21/62* (2013.01)
(Continued)

(52) U.S. Cl.
CPC .......... *G06F 21/6245* (2013.01); *G06F 21/00* (2013.01); *G06Q 30/00* (2013.01);
(Continued)

(58) Field of Classification Search
CPC ..... G06F 21/00; G06F 21/6245; H04L 63/06; H04L 63/20; H04L 67/22
See application file for complete search history.

(56) References Cited

U.S. PATENT DOCUMENTS

| 5,408,950 A | 4/1995 | Porto |
| 5,892,900 A | 4/1999 | Ginter et al. |

(Continued)

FOREIGN PATENT DOCUMENTS

| EP | 2270741 A1 | 1/2011 |
| JP | 2004070441 | 3/2004 |

(Continued)

OTHER PUBLICATIONS

Ebbert, J., "Is Audience Buying Possible in Mobile Advertising?," AdExchanger.com, Aug. 3, 2011 [online] [Retrieved on Dec. 2, 2011]; Retrieved from the Internet URL: http://www.adexchanger.com/mobile/audience-buying/; 9 pages.
(Continued)

*Primary Examiner* — Sayed Beheshti Shirazi
(74) *Attorney, Agent, or Firm* — Fish & Richardson P.C.

(57) ABSTRACT

Methods, systems, and apparatus, including computer programs encoded on a computer-readable storage medium, and including a method for managing privacy rights of a user related to the delivery of content. The method comprises providing a global privacy management interface that presents a selection tool for enabling a user to review privacy options and interests. The privacy options and interests include controls for presenting a list of identifiers that are associated with the user and interests associated with those identifiers. Each identifier is associated with a requesting source having been used by the user to access content. The interface enables de-selection of individual interests on a per-identifier or global basis. The method further comprises determining, in a server system, content to deliver to the user in view of the privacy selections.

20 Claims, 15 Drawing Sheets

Related U.S. Application Data continuation of application No. 13/538,782, filed on Jun. 29, 2012, now Pat. No. 8,978,158, which is a continuation-in-part of application No. 13/458,124, filed on Apr. 27, 2012, now Pat. No. 8,688,984.

(51) Int. Cl.
*G06F 21/00* (2013.01)
*G06Q 30/02* (2012.01)
*G06Q 30/00* (2012.01)
*H04L 29/06* (2006.01)
*H04L 29/08* (2006.01)

(52) U.S. Cl.
CPC ..... *G06Q 30/0255* (2013.01); *G06Q 30/0257* (2013.01); *G06Q 30/0269* (2013.01); *H04L 63/06* (2013.01); *H04L 63/20* (2013.01); *H04L 67/22* (2013.01)

(56) References Cited

U.S. PATENT DOCUMENTS

| | | | |
|---|---|---|---|
| 6,223,178 B1 | 4/2001 | Himmel et al. | |
| 6,324,566 B1 | 11/2001 | Himmel et al. | |
| 6,486,891 B1 | 11/2002 | Rice | |
| 7,308,261 B2 | 12/2007 | Henderson et al. | |
| 7,551,913 B1* | 6/2009 | Chien | G06F 21/6254 380/247 |
| 7,711,707 B2 | 5/2010 | Kelley et al. | |
| 7,729,977 B2* | 6/2010 | Xiao | G06Q 30/08 705/37 |
| 7,861,260 B2 | 12/2010 | Shkedi | |
| 8,041,602 B2* | 10/2011 | Haley | G06Q 30/02 705/14.1 |
| 8,065,185 B2 | 11/2011 | Foladare et al. | |
| 8,107,408 B2 | 1/2012 | Chindapol et al. | |
| 8,140,389 B2* | 3/2012 | Altberg | G06Q 30/02 379/900 |
| 8,271,328 B1 | 9/2012 | Baltz et al. | |
| 8,321,684 B2 | 11/2012 | Mumm et al. | |
| 8,359,274 B2 | 1/2013 | Yoder et al. | |
| 8,423,408 B1 | 4/2013 | Barnes et al. | |
| 8,438,184 B1* | 5/2013 | Wang | H04L 67/306 707/780 |
| 8,447,652 B2 | 5/2013 | Kilroy et al. | |
| 8,533,472 B2 | 9/2013 | Takasugi | |
| 8,666,812 B1 | 3/2014 | Gandhi | |
| 8,688,984 B2 | 4/2014 | Rajkumar et al. | |
| 8,798,456 B2* | 8/2014 | Skirmont | H04B 10/0773 398/10 |
| 8,799,456 B2* | 8/2014 | de Jager | G06F 21/552 709/224 |
| 8,832,319 B2 | 9/2014 | Kessel et al. | |
| 8,862,889 B2* | 10/2014 | Madden | G06F 21/6218 713/179 |
| 8,892,685 B1 | 11/2014 | Rajkumar et al. | |
| 8,966,043 B2 | 2/2015 | Rajkumar et al. | |
| 8,978,158 B2 | 3/2015 | Rajkumar et al. | |
| 9,009,258 B2 | 4/2015 | Ramachandran et al. | |
| 9,087,335 B2* | 7/2015 | Rane | G06Q 30/02 |
| 2003/0046290 A1 | 3/2003 | Yamada | |
| 2003/0061275 A1* | 3/2003 | Brown | H04L 67/02 709/203 |
| 2003/0061512 A1* | 3/2003 | Flurry | H04L 63/0815 726/4 |
| 2003/0149781 A1 | 8/2003 | Yared et al. | |
| 2003/0217687 A1 | 11/2003 | Segall | |
| 2003/0229900 A1 | 12/2003 | Reisman | |
| 2004/0068477 A1* | 4/2004 | Gilmour | G06F 17/30867 |
| 2004/0088363 A1 | 5/2004 | Doemling et al. | |
| 2004/0122735 A1 | 6/2004 | Meshkin | |
| 2004/0204997 A1 | 10/2004 | Blaser et al. | |
| 2005/0021747 A1 | 1/2005 | Jave | |
| 2005/0044423 A1 | 2/2005 | Mellmer et al. | |
| 2005/0076248 A1 | 4/2005 | Cahill et al. | |
| 2005/0268102 A1 | 12/2005 | Downey | |
| 2005/0278731 A1 | 12/2005 | Cameron et al. | |
| 2006/0020782 A1 | 1/2006 | Kakii | |
| 2006/0036857 A1 | 2/2006 | Hwang | |
| 2006/0080415 A1 | 4/2006 | Tu | |
| 2006/0101287 A1 | 5/2006 | Morten | |
| 2006/0136717 A1 | 6/2006 | Buer et al. | |
| 2007/0124201 A1 | 5/2007 | Hu et al. | |
| 2007/0136305 A1 | 6/2007 | Kelley et al. | |
| 2007/0136306 A1 | 6/2007 | Kelley et al. | |
| 2007/0174614 A1 | 7/2007 | Duane et al. | |
| 2007/0240226 A1* | 10/2007 | Song | G06Q 10/10 726/27 |
| 2008/0052775 A1 | 2/2008 | Sandhu et al. | |
| 2008/0098039 A1 | 4/2008 | Kruis et al. | |
| 2008/0140476 A1 | 6/2008 | Anand et al. | |
| 2008/0172373 A1 | 7/2008 | Jenson et al. | |
| 2008/0235243 A1 | 9/2008 | Lee et al. | |
| 2008/0243609 A1* | 10/2008 | Murto | G06Q 30/0242 705/14.41 |
| 2008/0275753 A1* | 11/2008 | Protheroe | G06Q 30/02 705/14.69 |
| 2009/0013051 A1 | 1/2009 | Renschler | |
| 2009/0018904 A1 | 1/2009 | Shipman et al. | |
| 2009/0048922 A1 | 2/2009 | Morgenstern et al. | |
| 2009/0077000 A1* | 3/2009 | Begole | G06Q 30/02 706/54 |
| 2009/0094642 A1* | 4/2009 | Hobson | H04N 5/44543 725/37 |
| 2009/0132813 A1 | 5/2009 | Schibuk | |
| 2009/0150238 A1 | 6/2009 | Marsh et al. | |
| 2009/0157502 A1 | 6/2009 | Cooper et al. | |
| 2009/0164557 A1 | 6/2009 | Marlow et al. | |
| 2009/0234708 A1 | 9/2009 | Heiser et al. | |
| 2009/0234909 A1 | 9/2009 | Strandell et al. | |
| 2009/0238496 A1* | 9/2009 | Liao | B65D 81/052 383/94 |
| 2009/0248496 A1 | 10/2009 | Hueter et al. | |
| 2009/0298480 A1 | 12/2009 | Khambete et al. | |
| 2009/0300745 A1 | 12/2009 | Dispensa | |
| 2009/0307759 A1 | 12/2009 | Schnell et al. | |
| 2009/0320091 A1* | 12/2009 | Torres | G06F 21/6218 726/1 |
| 2010/0057843 A1 | 3/2010 | Landsman et al. | |
| 2010/0088519 A1 | 4/2010 | Tsuruoka et al. | |
| 2010/0180009 A1* | 7/2010 | Callahan | G06Q 30/02 709/217 |
| 2010/0186084 A1 | 7/2010 | Hamid | |
| 2010/0199098 A1 | 8/2010 | King | |
| 2010/0293049 A1 | 11/2010 | Maher et al. | |
| 2010/0313009 A1 | 12/2010 | Combet et al. | |
| 2010/0318432 A1* | 12/2010 | Zinkevich | G06Q 30/02 705/14.71 |
| 2011/0010243 A1* | 1/2011 | Wilburn | G06Q 30/02 705/14.53 |
| 2011/0047032 A1* | 2/2011 | Kumar | G06Q 30/0269 705/14.66 |
| 2011/0055556 A1 | 3/2011 | Choi et al. | |
| 2011/0110515 A1 | 5/2011 | Tidwell et al. | |
| 2011/0153428 A1 | 6/2011 | Ramer et al. | |
| 2011/0154499 A1* | 6/2011 | Rohan | G06Q 20/40 726/26 |
| 2011/0213977 A1 | 9/2011 | Little | |
| 2011/0231478 A1 | 9/2011 | Wheeler et al. | |
| 2011/0251878 A1 | 10/2011 | Subramanian et al. | |
| 2011/0276383 A1* | 11/2011 | Heiser, II | G06Q 30/0224 705/14.25 |
| 2011/0289314 A1 | 11/2011 | Whitcomb | |
| 2011/0314114 A1* | 12/2011 | Young, III | G06Q 30/02 709/206 |
| 2012/0023547 A1* | 1/2012 | Maxson | G06F 21/6245 726/1 |
| 2012/0030554 A1 | 2/2012 | Toya | |
| 2012/0054680 A1* | 3/2012 | Moonka | G06Q 30/0269 715/810 |
| 2012/0060120 A1 | 3/2012 | Aravamudan et al. | |

(56) References Cited

U.S. PATENT DOCUMENTS

| | | | |
|---|---|---|---|
| 2012/0096088 A1* | 4/2012 | Fahmy | G06Q 10/10 709/204 |
| 2012/0096491 A1 | 4/2012 | Shkedi | |
| 2012/0109734 A1* | 5/2012 | Fordyce, III | G06Q 20/10 705/14.25 |
| 2012/0124161 A1 | 5/2012 | Tidwell | |
| 2012/0158491 A1 | 6/2012 | Goulden et al. | |
| 2012/0167185 A1 | 6/2012 | Menezes et al. | |
| 2012/0253920 A1 | 10/2012 | Yarvis et al. | |
| 2012/0253926 A1 | 10/2012 | Chen et al. | |
| 2012/0321143 A1* | 12/2012 | Krupka | G06K 9/00677 382/118 |
| 2012/0323674 A1 | 12/2012 | Simmons et al. | |
| 2012/0323686 A1 | 12/2012 | Burger et al. | |
| 2012/0324027 A1 | 12/2012 | Vaynblat et al. | |
| 2012/0331287 A1 | 12/2012 | Bowman et al. | |
| 2013/0036434 A1 | 2/2013 | Shkedi et al. | |
| 2013/0055309 A1 | 2/2013 | Dittus | |
| 2013/0110623 A1 | 5/2013 | Kilroy et al. | |
| 2013/0124309 A1* | 5/2013 | Traasdahl | H04L 67/22 705/14.49 |
| 2013/0124628 A1 | 5/2013 | Weerasinghe | |
| 2013/0159254 A1* | 6/2013 | Chen | G06F 17/30867 707/639 |
| 2013/0169434 A1* | 7/2013 | McCown | G08B 21/00 340/540 |
| 2013/0179502 A1* | 7/2013 | Faller | H04L 65/403 709/204 |
| 2013/0238745 A1 | 9/2013 | Ramachandran et al. | |
| 2013/0246527 A1 | 9/2013 | Viera | |
| 2013/0252628 A1* | 9/2013 | Kuehnel | H04W 4/02 455/456.1 |
| 2013/0254685 A1 | 9/2013 | Batraski et al. | |
| 2013/0290503 A1 | 10/2013 | Rajkumar et al. | |
| 2013/0290711 A1 | 10/2013 | Rajkumar et al. | |
| 2013/0291123 A1 | 10/2013 | Rajkumar et al. | |
| 2013/0332987 A1 | 12/2013 | Tenneti et al. | |
| 2014/0123309 A1 | 5/2014 | Jung | |
| 2014/0188766 A1 | 7/2014 | Waldman | |
| 2014/0244351 A1* | 8/2014 | Symons | G06F 17/30091 705/7.29 |
| 2015/0100426 A1* | 4/2015 | Hartzell | G06Q 30/0261 705/14.58 |
| 2015/0127628 A1* | 5/2015 | Rathod | H04W 4/206 707/710 |
| 2015/0242896 A1 | 8/2015 | Rajkumar et al. | |
| 2015/0170200 A1 | 9/2015 | Rajkumar et al. | |

FOREIGN PATENT DOCUMENTS

| | | |
|---|---|---|
| JP | 2007102780 | 4/2007 |
| JP | 2011-3155 | 1/2011 |
| JP | 2011-096093 A | 5/2011 |
| KR | 10-2012-0004054 | 1/2012 |
| WO | WO 2007059087 | 5/2007 |
| WO | WO 2011109865 | 9/2011 |

OTHER PUBLICATIONS

Marshall, J., "Device Fingerprinting Could Be Cookie Killer," ClickZ.com, Mar. 2, 2011 [online] [Retrieved on Dec. 2, 2011]; Retrieved from the Internet URL: http://www.clickz.com/clickz/news/2030243/device-fingerprinting-cookie-killer/; 4 pages.
International Search Report in International Application No. PCT/US2013/038461, dated Sep. 17, 2013, 12 pages.
International Search Report in International Application No. PCT/US2013/038457, dated Sep. 17, 2013, 10 pages.
International Search Report in International Application No. PCT/US2013/038482, dated Aug. 12, 2013, 10 pages.
International Search Report and Written Opinion for Application No. PCT/US2013/029384, dated Jun. 17, 2013, 12 pages.

* cited by examiner

Ads Preferences _256a_

▲ Ads on Search and Mail
▼ Ads on the Web ⎤ _258a_

Opt out ← _260_

Your categories
Below you can review a summary of the inferred interests that the System has associated with your cookie(s)/device(s). You can remove or edit your interests at any time. _264a_

Travel
Sports  } _262_
Oceans
Games

Your demographics
Below you can review a summary of the inferred demographics that the System has associated with your cookie(s)/device(s). You can remove or edit your demographics at any time. _264b_

Male
Age 35-44  } _266_

Your cookies
Below are the cookies from devices and/or apps that are associated with you. You can remove or unlink your cookies at any time. _272_

Anonymously linked cookies _What is this?_ _270_
id=c8f9ce03f000042 "Home PC"
id=c8f9ce03f000043 "My Cell Phone"  } _268a_
id=c8f9ce03f000045 "<App: Example Game>"

Unlinked cookies
id=c8f9ce03f000044 "<Browser XYZ>"  } _268b_

```
┌─────────────────────────────────────────────────────────────────────┐
│ Link multiple anonymous identifiers associated with a user by a     │
│ service using a key exchange protocol without storing personally    │
│ identifiable information associated with the user in the linking    │
│                                                                 342 │
└─────────────────────────────────────────────────────────────────────┘
```
```
┌─────────────────────────────────────────────────────────────────────┐
│ Receive requests at the service for content from a client device    │
│ associated with the user, wherein each request includes one of the  │
│ anonymous identifiers                                           344 │
└─────────────────────────────────────────────────────────────────────┘
```
```
┌─────────────────────────────────────────────────────────────────────┐
│ Provide content associated with the user that is responsive to the  │
│ received requests and based on the linking.                     346 │
└─────────────────────────────────────────────────────────────────────┘
```

```
┌─────────────────────────────────────────────────────────────────────┐
│ Create public-private key pairs for a user each time the user logs  │
│ into a service from a different device including publishing         │
│ respective public keys of the user in a directory entry associated  │
│ with the user                                                   362 │
└─────────────────────────────────────────────────────────────────────┘
```
```
┌─────────────────────────────────────────────────────────────────────┐
│ Create, by each device, a secret key using a public key of another  │
│ device that is stored in the directory that does not include        │
│ personally identifiable information associated with users       364 │
└─────────────────────────────────────────────────────────────────────┘
```
```
┌─────────────────────────────────────────────────────────────────────┐
│ Associate the secret keys with a plurality of anonymous identifiers,│
│ each anonymous identifier assigned to the user when logged into a   │
│ respective different device                                     366 │
└─────────────────────────────────────────────────────────────────────┘
```
```
┌─────────────────────────────────────────────────────────────────────┐
│ Provide content associated with the user and based at least in part │
│ on the association                                              368 │
└─────────────────────────────────────────────────────────────────────┘
```

FIG. 3C

PRIVACY MANAGEMENT ACROSS MULTIPLE DEVICES

CROSS-REFERENCE TO RELATED APPLICATIONS

This application is a continuation of and claims priority to U.S. application Ser. No. 14/641,768, filed on Mar. 9, 2015, which is a continuation of U.S. application Ser. No. 13/538,782, filed on Jun. 29, 2012 (now U.S. Pat. No. 8,978,158), which is a continuation-in-part of U.S. application Ser. No. 13/458,124, filed on Apr. 27, 2012 (now U.S. Pat. No. 8,688,984). The entire disclosures of each of the prior applications are considered part of and are incorporated by reference in the disclosure of this application.

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can then be provided to the user on any devices associated with the user such as a personal computer (PC), a smartphone, a laptop computer, or some other user device.

SUMMARY

In general, one innovative aspect of the subject matter described in this specification can be implemented in methods that include a computer-implemented method for managing privacy rights of a user related to the delivery of content. The method comprises providing a global privacy management interface that presents a selection tool for enabling a user to review privacy options and interests, the privacy options and interests including controls for presenting a list of identifiers that are associated with the user and interests associated with those identifiers, each identifier associated with a requesting source having been used by the user to access content. The interface enables de-selection of individual interests on a per-identifier or global basis. The method further comprises determining, in a server system, content to deliver to the user in view of the privacy selections.

These and other implementations can each optionally include one or more of the following features. The method can further comprise providing a single content item privacy management interface that enables a user to manage privacy settings for a given session and related to a particular content item that is presented to the user, where determining content to deliver to the user further includes determining content to deliver to the user in view of the privacy settings. The method can further comprise creating a global privacy policy for a given user, the global privacy policy including a mapping of a plurality of cookies associated with the user, each cookie associated with a requesting source having been used by the user to access content, where each cookie includes session information and any enumerated preferences of the user, either inferred or explicitly defined, the preferences being used to determine content to be delivered to the user in response to received requests from the user, and where creating a global privacy policy includes aggregating privacy policy information from each cookie in the plurality of cookies to form the global privacy policy. The privacy options and interests can include individual categories of content that are associated with the user based on past user behavior, each category being associated with, and being presented along with a designator for, a particular identifier for a requesting source that is associated with an explicitly received or inferred interest and where the global privacy management interface further includes controls to approve or disapprove any of the categories. The controls can further include a control to opt in or opt out of any category or the use of any information associated with a single identifier. The controls can further include controls for adding additional categories to be used in the selection of content to be delivered to the user. The serving system can serve advertisements to the user based on the privacy selections. The method can further comprise receiving, from a user, a selection of a privacy selection in association with a given session, storing the privacy selection in association with a global policy for the user, and presenting, to the user, all privacy selections received in various sessions with the user that are in effect in determining content to be delivered to the user by the serving system. The method can further comprise resolving a name for a requesting source associated with each identifier and presenting the name when presenting privacy selections associated with a given cookie. The method can further comprise presenting a control to enable a user to un-link individual identifiers or all identifiers in a user's account, thereby allowing the user to isolate interests on a per requesting source or group of requesting sources basis. The identifiers can be linked using a Diffie-Hellman key protocol. The identifiers that are linked can use a secret key derived from a seed that is unique to the user. The identifiers can include cookies from different devices, different browsers or different applications.

In general, another innovative aspect of the subject matter described in this specification can be implemented in methods that include another computer-implemented method for providing a content item. The method comprises providing a content item to a user responsive to a request for content, the content item selected at least in part based on information about linked identifiers of multiple requesting sources associated with the user, the identifiers linked anonymously without storing personally identifiable information. The method further comprises providing a control for manipulation by a user to reveal information about how a selection of a content item was performed. The method further comprises receiving a selection of the control. The method further comprises providing to the user responsive to the selection information about how the content item was selected including preference information used to determine the selection that was inferred about or explicitly received from the user, the information including an identification of the multiple requesting sources.

These and other implementations can each optionally include one or more of the following features. The method can further comprise, responsive to the received selection, presenting an indicator associated with a requesting source that is associated with the preference information. The method can further comprising presenting a control for linking to a preference manager, the preference manager enabling the user to change preferences associated with the user that are used by a serving system when selecting content items for delivery to the user. The preference manager can be a global preference manager that manages preferences of a user associated with plural different requesting sources. Each requesting source can be associated with a unique identifier that is mapped to the user. The preference manager can include a list of linked identifiers, one per requesting source that are used by a serving system to determine content items to deliver to the user. The method can further comprise presenting a control to enable a user to un-link individual identifiers or all identifiers in a user's account, thereby allowing a user to isolate interests on a per requesting source or group of requesting sources basis. The identifiers can be linked using a Diffie-Hellman key protocol. The identifiers can be linked using a secret key derived from a seed that is unique to the user. The content item can be an advertisement. The method can further comprise providing a control to enable the user to block the content item or to block all future content items from a content provider associated with the content item. The control can enable the user to specify per-identifier or global blocking. The unique identifiers can include identifiers from different browsers or different applications. The requesting sources can be selected from a group comprising a mobile device, a desktop device, a tablet, a browser, an application, or other device.

Particular implementations may realize none, one or more of the following advantages. Content can be provided to a user based at least in part on prior delivered content, such as content previously delivered to a user on one of a plurality of different devices. Associations among anonymous identifiers can be used to enable delivery of interesting content to a user. Content sponsors can be provided with more precise mechanisms for delivering content to users.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2G shows an example privacy interface for managing privacy rights of a user related to the delivery of content.

FIG. 3B is a flowchart of an example process for providing content to a user on any of multiple devices associated with the user.

FIG. 3C is a flowchart of an example process for providing content to a user on any of multiple devices using public-private keys.

Like reference numbers and designations in the various drawings indicate like elements.

DETAILED DESCRIPTION

Figure 1:
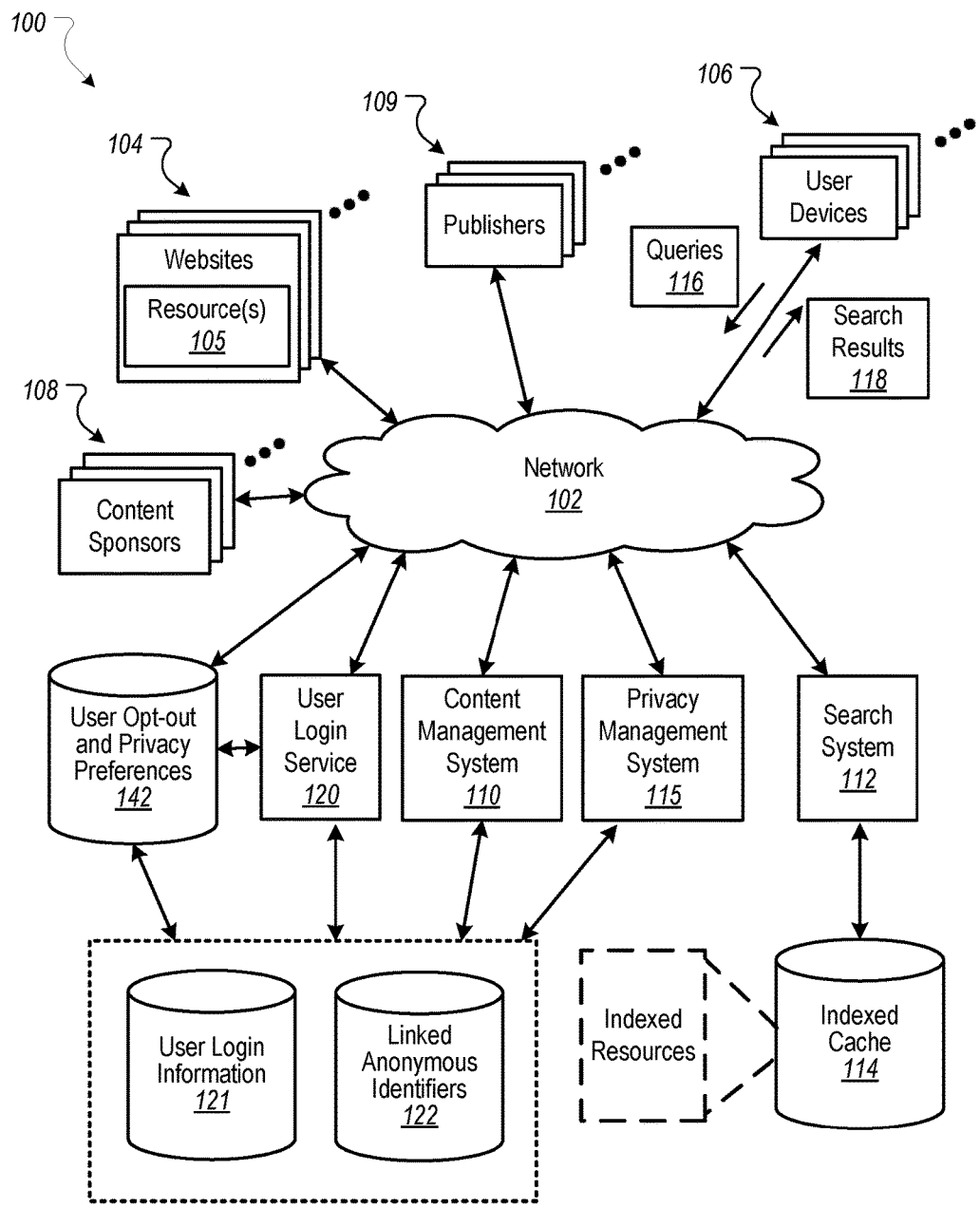
FIG. 1 is a block diagram of an example environment for delivering content.

This document describes methods, processes and systems for providing content to, and managing privacy settings for, a user having or being associated with multiple devices, without storing personally identifiable information associated with the user. For example, when a user logs onto a user service from a first device (e.g., the user's home PC), a public key-private key pair can be determined and the public key can be published. The public key can be associated with the user's first device and stored by the user service. The private key can be stored locally. Subsequently, when the user logs into the service from a second different device (e.g., a different physical device, browser or application), the second different device can also determine a public-private key pair. Each device can subsequently compute a secret key using the device's own private key and the other device's published public key. The secret key can be stored in combination with anonymous identifiers (e.g., an anonymous cookie) of each device, thus creating a linking or association between the devices. While different cookies are typically associated with different devices, a set of different cookies associated with any of a number of different type of requesting sources used by a user (such as browsers, applications (e.g., games, mobile apps), physical devices (e.g., desktop devices, mobile devices, tablets, smart phones or other physical devices) or any requesting source that requests and receives content) can be linked as will be discussed in further detail below.

In some implementations, the anonymous identifiers can be cookies, browser cookies, device identifiers, or other identifiers that are associated with a given device. As a result, the mapping can identify all of the devices associated with the user without storing personally identifiable information (PII) associated with the user. When content is subsequently provided to the user on any of the devices, information included in the mapping can be used, for example, to assist in selecting relevant content to be provided to the user. The selection of relevant content can include decisions regarding how content is delivered to the user, such as and including, limitations on when or how content is delivered. For example, the number of impressions of an advertisement can be limited to a fixed number of impressions per user per time period regardless of how many devices the user uses.

In some implementations, anonymous identifiers can be associated with different browsers or other applications on the same device. For example, the techniques described in this disclosure can be used to link two or more identifiers of applications that may have different cookie spaces on the same device, or applications on different devices, or a combination of both.

In some implementations, linking anonymous identifiers can be used in handshaking among mobile applications or a combination of mobile applications, browsers and other applications. For example, mobile applications may each have their own cookie space even on the same device which can prevent handshaking with other applications. Each mobile application can use the techniques described herein to generate, for example, a private key an a public key, publish the public key, access public keys of other mobile applications (or associated with other devices), and compute secret keys using their own private keys and the public keys of other mobile applications (or associated with other devices).

In some implementations, users may be provided with an opportunity to opt in/out of programs or features that allow the user to be discovered across multiple devices and/or to be provided content based on the discovery.

In some implementations, the mapping process can be repeated periodically to ensure that the anonymous identifiers (e.g., cookies) are not stale, thus keeping session history information for the user up-to-date. For example, cookies on a computer can expire over time, or a user can clear a cookie, resulting in setting a new cookie. Repeating the cookie-mapping process periodically can ensure that the current set of cookies belonging to the user are correctly mapped. While reference is made to cookies, other forms of anonymous identifiers that include or have been derived from a seed can be used.

In some implementations, user session history information can be stored anonymously. For example, the session history information can include a user's browsing history, the times that the user has seen a particular advertisement, and other session history information. The information can be stored in association with the anonymous identifiers described herein. In some implementations, session history information associated with the user's session on a first device can be stored in a table that includes the anonymous identifier associated with the first device. The same table can also be used to store the same user's session history information for the user's session on a second different device. In some implementations, a separate or the same table can be used to store associations among the anonymous identifiers. In some implementations, anonymous identifiers, the associations (e.g., linking to the secret key), and the session data all can be stored, for example, without any corresponding personally identifiable information for a given user.

As will be described in further detail below, subsequent to the storage of the association and session history information, a request for content (e.g., an advertisement) can be sent from any of the devices associated with that user (the request including an anonymous identifier associated with a given device). In some implementations, the session history information stored in the tables can be used in determining, for example, advertisements that may be of interest to the user responsive to the received request. The determination can include inferences for the user based on the user's stored session history information. In some implementations, the session history information for the user can be aggregated, e.g., by joining tables using the anonymous identifiers. For example, a request for content can be received, and the request can include an anonymous identifier associated with a user's desktop device. The received anonymous identifier can be used to look up the user's other anonymous identifiers (e.g., for mobile and other devices of the user). The retrieved set of anonymous identifiers can be used access to session history information in the other tables (e.g., user browsing history). In some implementations, all of the session history information can be joined together for the respective devices producing aggregated information. In some implementations, some session history information can be aggregated while other information remains separate. For example, the number of times that an advertisement was seen by the user can be stored in aggregate (e.g., with other users' information), whereas the sites visited by the user can be stored without aggregation. In some implementations, the aggregated session history information can be provided to a content management system in order to determine and select eligible content for delivery to the user responsive to the received request. For example, because the session history information can include the number of times that the user has seen a particular advertisement, the content management system can help to avoid selecting an advertisement for the user which has already been presented a predetermined number of times.

In some implementations, aggregating the information can occur on demand, e.g., in real time after a request for content occurs. For example, the user's session history information, stored individually by anonymous identifier in the various tables, can be joined. Aggregating the information in real time can solve issues, for example, related to whether the user has opted out of being provided content based on the devices used by the user. For example, session history information for a device for which the user has opted out will not be aggregated with other session history information. In some implementations, the information for a user can be aggregated and stored in advance of any requests for content. For example, all of the user session history information can be stored in a third table, e.g., that includes all of the user session history information across all of the user's linked devices.

FIG. 1 is a block diagram of an example environment 100 for delivering content. The example environment 100 includes a content management system 110 for selecting and providing content in response to requests for content and a privacy management system 115 for managing privacy settings for users. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, the content management system 110, and the privacy management system 115. The example environment 100 may include many thousands of websites 104, user devices 106, content sponsors 108 and publishers 109.

The privacy management system 115 can generate several interfaces, each of which can be presented to the user when circumstances are warranted. For example, one or more interfaces can be global interfaces that control how a user's anonymous identifiers (e.g., cookies) are used and optionally, linked with other identifiers in order to provide content (e.g., advertisements) that are personalized for, and more interesting to, the user. Other interfaces can be session-generated, e.g., available when the user is performing an action, such as browsing, or when the user is logged in through user login service. Additional interfaces can be presented when, for example, content has been provided to the user. For example, an explanation can be provided along with certain content that describes how the content was selected, e.g., in light of the user's privacy settings and information inferred or otherwise known about the user. In some implementations, all such interfaces related to privacy can allow the user to make changes to privacy settings at any time in order to achieve a balance regarding privacy while still receiving personalized and interesting content. For example, FIGS. 2G through 2K described below depict example interfaces that can be generated and managed by the privacy management system 115.

In some implementations, the example environment 100 further includes a user login service 120 that can provide, for any particular user, access to the user's Web services, e-mail, social networks, business applications or other resources. For example, the user login service 120 can receive login requests from the user, such as through a Web browser or other application running on any device associated with the user. The login request can include, for example, the user's login ID (e.g., a unique identifier, an email address, a phone number, or any other identifier for the user that can be used for verifying the user at login). The user login service 120 can also maintain information related to the devices on which the user is currently logged on, or has been logged into recently. The information can include, for example, a mapping of anonymous identifiers for the devices with a session key that does not contain personally identifiable information associated with the user. In some implementations, the mapping can be stored, for each user, in a data store of linked anonymous identifiers 122, or in some data structure.

In some implementations, the user login information 121 or some other data store can store user login IDs, public keys and initial seeds. For example, the information can be used by a second device used by a user to access the public key published by a first device used by the same user. Similarly, the user's first device can access the public key published by the second device. At the same time, seed values can be read from the user login information 121 by any of the user's devices and used to determine a secret key.

A data store of user opt-out and privacy preferences 142 can include information that the user has provided regarding when and how information about the user's different devices can be used. For example, users can access one or more user preferences web pages that may be part of (or separate from) the user login service 120. In some implementations, users can set a preference that indicates, "Do not link my different devices," or selectively identify which devices are allowed (or not allowed) to be linked. The user's user opt-out and privacy preferences 142 can be checked, and the linking can be performed only if allowed by the user. In some implementations, the user may specify settings that prohibit providing content based on the linking. For example, while the user may allow his smart phone and PC to be linked, the user may decide that no content (e.g., advertisements) should be provided based on the linking.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a popup window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X)

or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information that is associated with the mappings described above, can be used and/or evaluated when selecting eligible content.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by recognizing a user when the user has accessed resources using multiple devices. For example, if it is known that a content item (e.g., an advertisement) has already been seen by a user on a first device (e.g., the user's home PC), then a determination can be made (e.g., through parameters) whether or not to provide the same content item to the same user on a different device (e.g., the user's smartphone). This can increase the likelihood of a conversion, for example, by either repeating impressions of an advertisement or avoiding subsequent impressions, depending on how multiple impressions for the advertisement to the same user are predicted to lead to a conversion in either case.

For situations in which the systems discussed here collect personal information about users, the users may be provided with an opportunity to opt in/out of programs or features that may collect personal information (e.g., information about a user's social network, social actions or activities, a user's preferences or a user's current location). In addition, certain data may be anonymized in one or more ways before it is stored or used, so that personally identifiable information associated with the user is removed. For example, a user's identity may be anonymized so that no personally identifiable information can be determined for the user, or a user's geographic location may be generalized where location information is obtained (such as to a city, ZIP code, or state level), so that a particular location of a user cannot be determined.

FIGS. 2A-2E collectively show an example system 200 for providing content to a user who is recognized when using multiple different devices. In some implementations, recognition of the user across different devices can be achieved by linking anonymous identifiers of the user's multiple different devices. As an example, an anonymous identifier 206a of a first device 106a (e.g., a desktop computer of a user 202) can be linked to an anonymous identifier 206b of a second different device 106b (e.g., a laptop computer of the user 202). In some implementations, the system 200 can be part of the environment 100 that is described above with reference to FIG. 1. An example sequence of events (e.g., with numbered steps 0 and 1a through 8) follows for associating the anonymous identifiers 206a and 206b and providing content based on the association. However, other sequences can also be used to link devices 106a, 106b and additional devices 106 associated with the user 202. In some implementations, the devices 106a, 106b and additional devices 106 can be linked using associations stored in the linked anonymous identifiers 122. The associations can be stored, for example, without storing any personally identifiable information for the user 202.

Before any linking occurs using the anonymous identifiers associated with a user's different devices, the user login service 120 (or the content management system 110) can check 107 the user's user opt-out and privacy preferences 142 to see if the user has opted out of such linking. For example, if the user has specified not to allow the user's devices to be linked (or use information thereof), then steps 2a though 6b will not occur, and the content provided in step 8 may be different.

In some implementations, a first step 1a (e.g., as allowed by the user) of the sequence of steps can occur, for example, when the user 202 logs into the first device 106a (e.g., the user's desktop computer) using a login service (not shown in FIGS. 2A-2D). For example, the login service or some other component can receive a login request 208a from the first device 106a. The login request 208a can be associated with the anonymous identifier 206a (e.g., a cookie or device identifier) associated with the first device 106a. In some implementations, the login request 208a and/or other login requests can be requests to log into a social service.

In some implementations, the user login information 121 can store user login IDs 210, seeds 212 and public keys 214 associated with multiple users. The user login information 121, for example, can serve as a directory that includes one or more entries, each entry indexed by an identifier associated with a given user (e.g., user login identifier, email address, or some other identifier). For example, when the user 202 logs into the device 106a using the login service, information stored for the user in the user login information 121 can include a login ID 210a, a seed 212a (e.g., a generator-prime pair, such as 7, 11, that is usable by all of the user's devices), and, as will be discussed in further detail below, a public key 214. At the current stage of the sequence of steps, the public key 214 has not yet been determined for the current user. In some implementations, seeds 212 can vary by user, e.g., the seed 212b (e.g., generator-prime pair 7, 13) for a second user can be different from the seed 212a.

At step 2a, the first device 106a can read a seed 216a (e.g., a generator-prime pair 7, 11 from the user login information 121) and create a private-public key pair that is associated with the user 202 using the first device 106a. In some implementations, creating the private-public key pair can include, at step 3a, computing 218a a private key (e.g., 9) and computing a public key (e.g., 4). In some implementations, generation of public and private keys can use generator G, prime P pair (e.g., 7, 11), where G<P, an example of which is described with reference to FIG. 2F. At step 4a, the public key is published 220a, e.g., stored as the public key 214a. The private key n and the public key 4 constitute the private-public key pair, yet each typically is stored in a different location. For example, the private key n can be stored locally on the first device 106a, e.g., in local storage 219. The public key (e.g., 4) can be stored in the user login information 121 as the public key 214a. In some implementations, the public key 214a can be stored in a row 222 that includes user login information for the user 202 on one or more devices (e.g., devices 106a and 106b in the current example). For example, the row 222 can serve as a directory entry associated with the user 202. Each of the other rows can be used to store information for a different user.

Figure 2A:
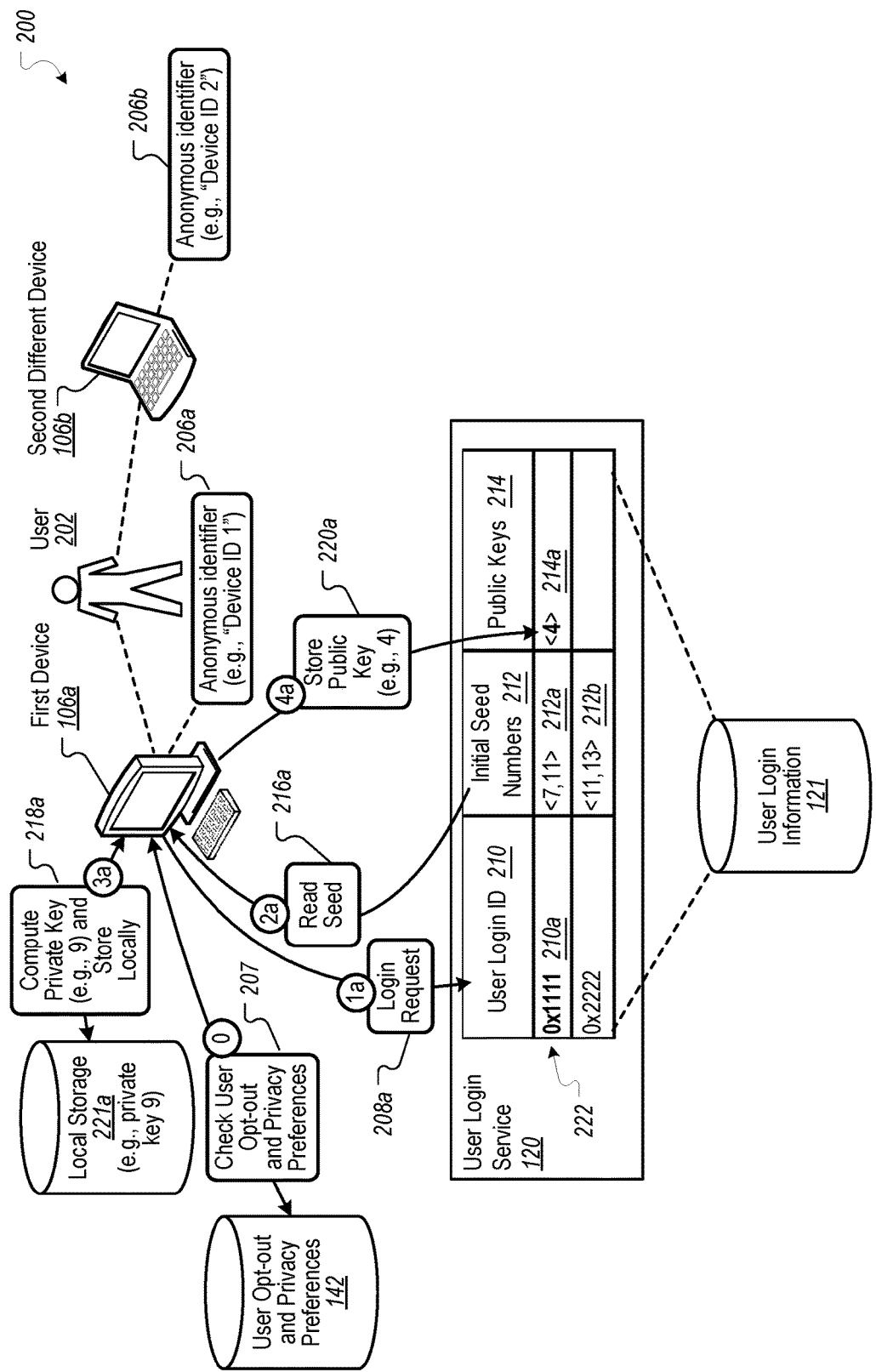
FIGS. 2A through 2E collectively show an example system for providing content to a user who is recognized when using multiple different devices.
Figure 2B:
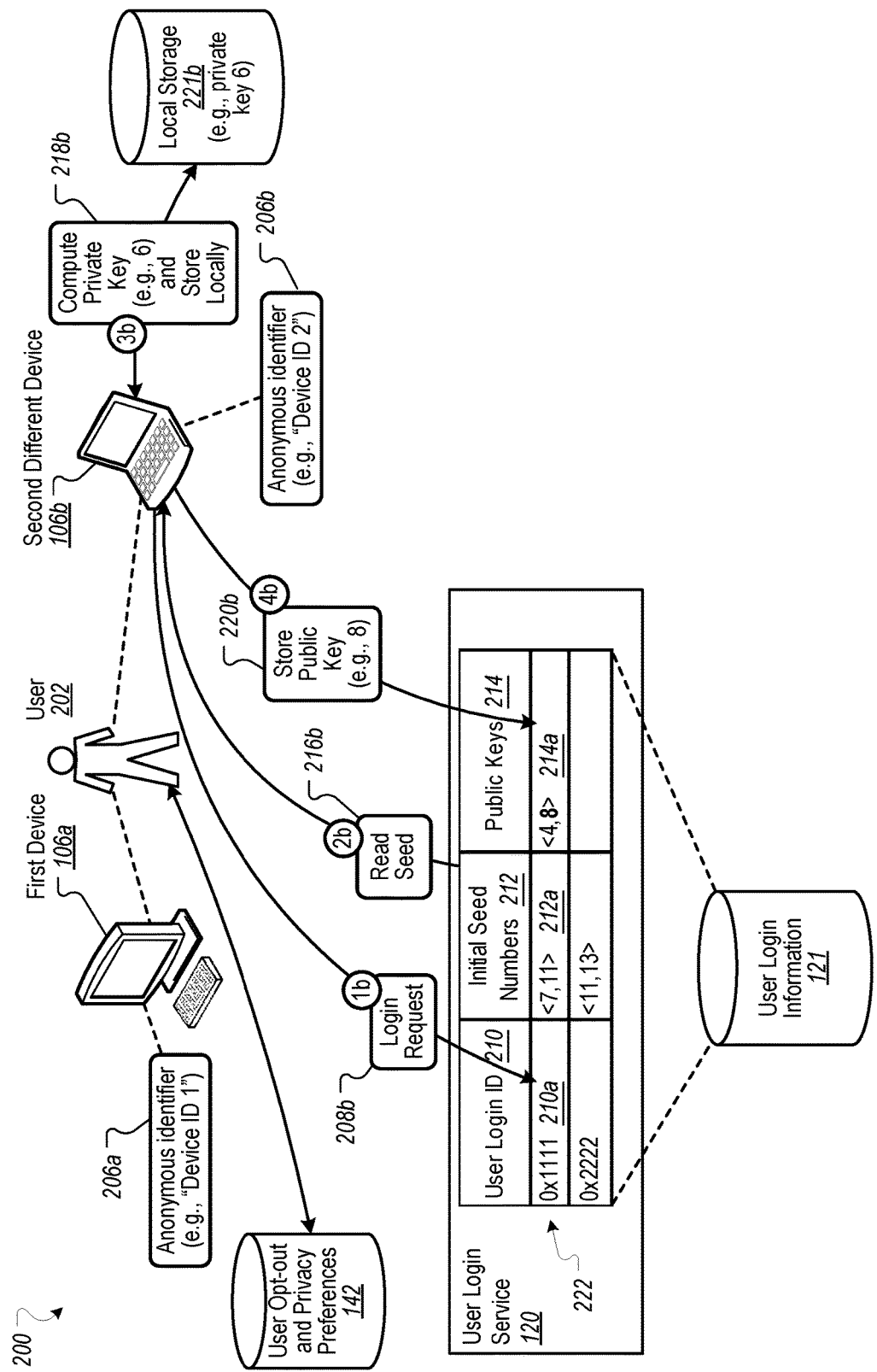

Referring now to FIG. 2B, at step 2b, after a login by the user on a second different device 106b, a seed 216b (e.g., the generator-prime pair 7, 11) can be read (e.g., from the user login information 121) and a second private-public key pair that is associated with the user can be created. The second private-public key pair is associated with the user 202 using the second device 106b. For example, the second private-public key pair is different than the private-public key pair that is associated with the login by the user 202 on the first device 106a. In some implementations, creating the second private-public key pair can include, at step 3b, computing 218b a private key (e.g., m) and computing a second public key (e.g., 8). At step 4b, the second public key is published 220b, e.g., by adding the second public key to the set of public keys stored as the public keys 214a. The private key m and the public key 8 constitute the second private-public key pair (e.g., <m, 8>), the values of which are different from those of the private-public key pair computed for the first device 106a (e.g., <n, 4>). In some implementations, the private key m can be stored locally on the second different device 106b, e.g., in local storage 221b. The public key (e.g., 8) can be stored, for example, in user login information 121 with the public key 4 from the first device 106a. As a result, the directory entry stored in the row 222 (and associated with the user 202) is updated, now including two public keys.

Figure 2C:
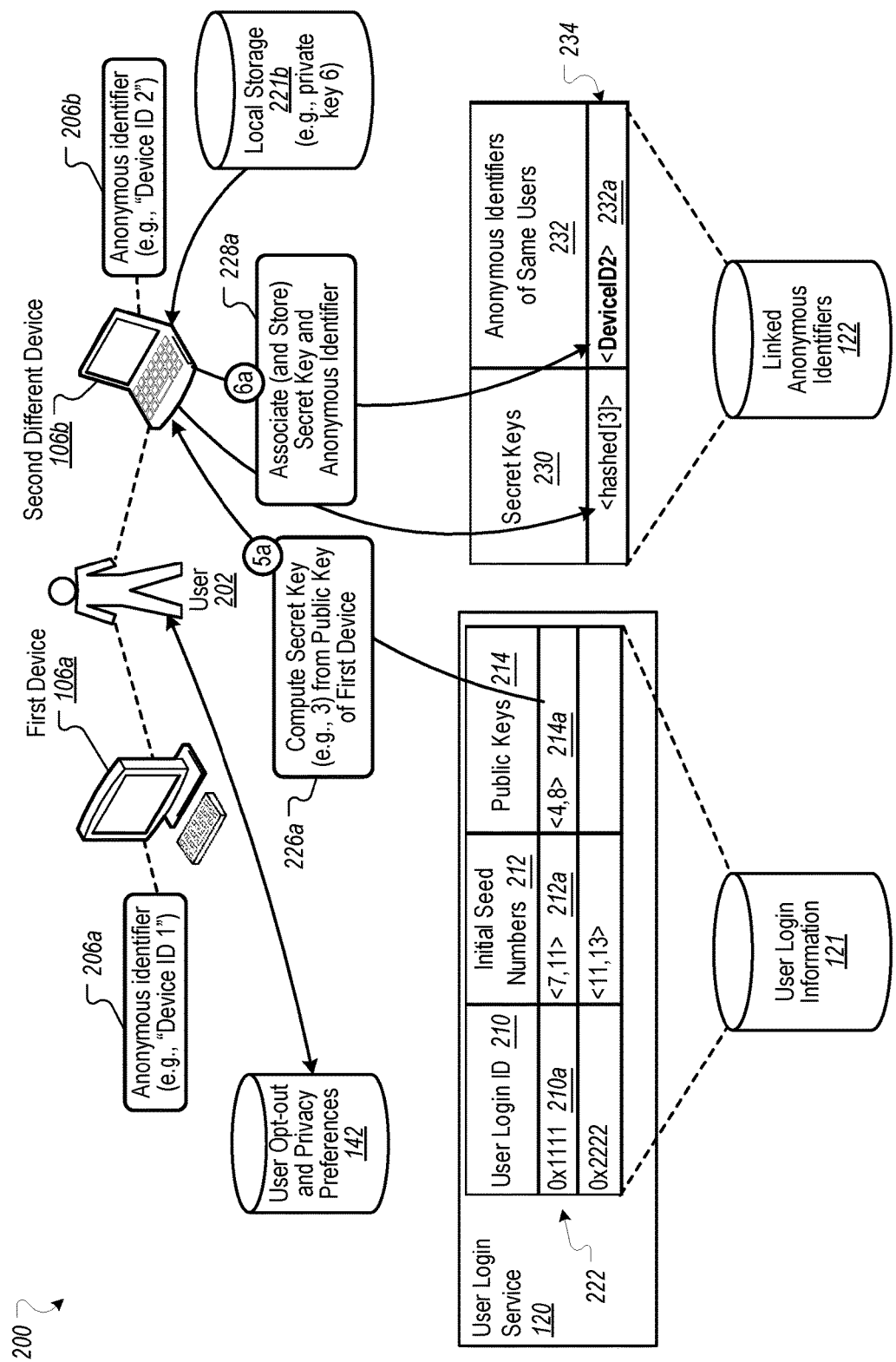

Referring now to FIG. 2C, at step 5a, the second different device 106b can create a secret key 226a (e.g., 3) using the public key (e.g., 4) from the first device 106a and the second private key (e.g., private key m from local storage 221b). At step 6a, the second different device 106b can also associate 228a the second anonymous identifier (e.g., "Device ID 2") with the secret key (e.g., 3). In some implementations, the association can include storing the association, e.g., in the linked anonymous identifiers 122. For example, the linked anonymous identifiers 122 can include secret keys 230 and anonymous identifiers of the same users 232. For example, a row 234 can include a secret key 230a (e.g., 3 or a hashed representation of 3) and the anonymous identifier 232b (e.g., "Device ID 2") that corresponds to the association that occurred in step 6a. At a time subsequent to the publishing of the second public key (e.g., 8), and after the secret key 3 has been computed and an association stored (e.g., as a hashed representation) with the second different device 106b, the user may log in again at the first device 106a. As a result, a login request 208c can be received (e.g., by the login service) from the user at the first device 106a. For example, the login request 208c can be similar to the login request 208a described above. However, in this case, the login service, for example, can determine that a public key exists for another device associated with the user, e.g., the second different device 106. Using the additional public key, a link or association can be made between the two devices 106a and 106b as described in further detail below. In some implementations, whenever the secret key is stored, the stored value can be a hashed version of the secret key, e.g., using a one-way hash function.

Figure 2D:
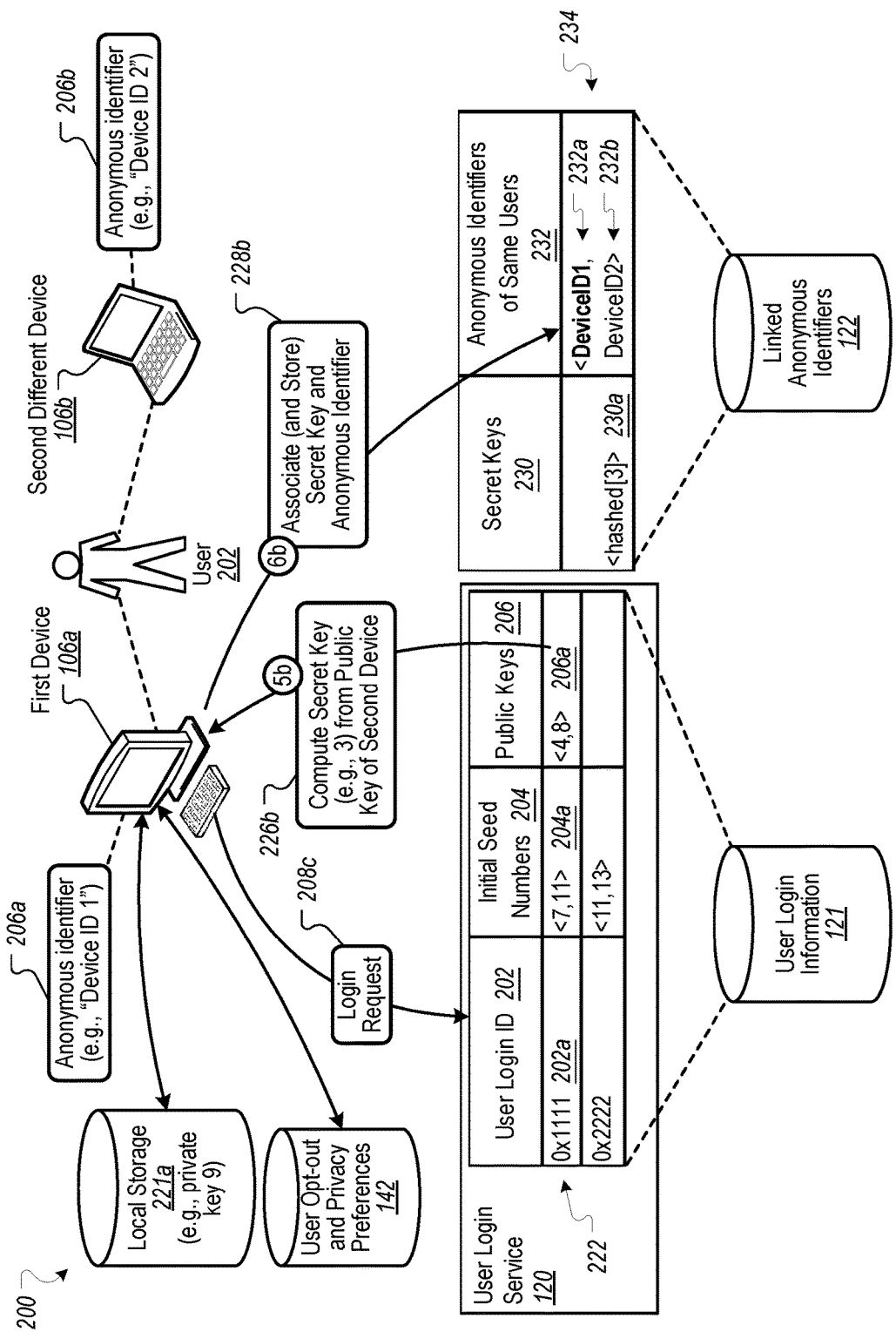

Referring now to FIG. 2D, at step 5b, in response to the login request 208c, the first device 106a can create a secret key 226b (e.g., 3) using the public key (e.g., 8) from the second different device 106b and the first private key (e.g., private key n from local storage 221a). For example, the secret key can match the secret key computed by the second different device 106b. At step 6b, the first device 106a can also associate 228b the second anonymous identifier (e.g., Device ID 2) with the secret key (e.g., 3). In some implementations, the association can include storing the association, e.g., in the linked anonymous identifiers 122. For example, the row 234 containing the secret key 230a (e.g., 3) and the anonymous identifier 232b (e.g., "Device ID 2") can be updated to also include the anonymous identifier 232a (e.g., "Device ID 1"). As a result of storing the association, the anonymous identifiers 206a and 206b, as well as the devices 106a and 106b, are now linked. Further, the association among the user's various devices is achieved without storing any personally identifiable information associated with the user.

In some implementations, it is possible that one or more anonymous identifiers such as anonymous identifier 232a or anonymous identifier 232b can appear in multiple rows (e.g., three or more) in the linked anonymous identifiers 122. This can be an indication, for example, that the device associated with the anonymous identifier is a shared device (e.g., at a library or an Internet café). In this example, the logins by several different users (e.g., three or more) would result in the creation of multiple rows in the anonymous identifiers 122, each having the same anonymous identifier. In some implementations, when highly-shared devices are detected in this way, the highly-shared devices can be un-linked, or other considerations can be taken. For example, thresholds can be established, and if a cookie or other anonymous identifier appears in more than three rows, the associated can be considered a shared machine.

Figure 2E:
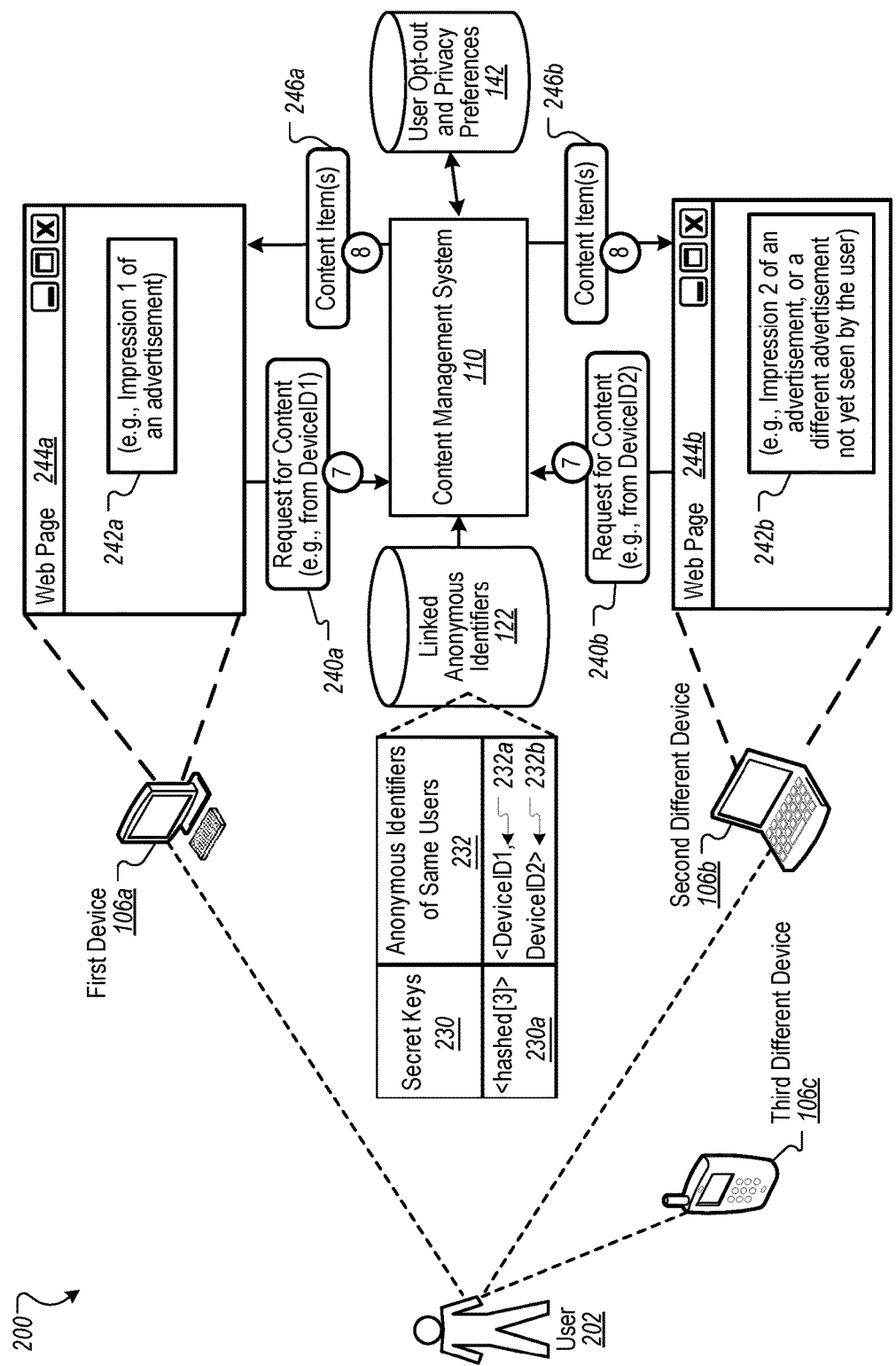

Referring to FIG. 2E, at step 7, the content management system 110 can receive a request for content 240a or 240b (e.g., a request for advertising content) from either the first device 106a or the second different device 106b. For example, the request for content 240a can be a request for an advertisement to fill an advertisement slot 242a on a web page 244a displayed on the first device 106a. In another example, the request for content 240b can be a request for an advertisement to fill an advertisement slot 242b on a web page 244b displayed on the second different device 106b. If the request for content 240a is from the first device 106a, for example, then the request for content can include the first anonymous identifier 232a. Otherwise, if the request for content 240b is from the second different device 106b, for example, then the request for content can include the second different anonymous identifier 232b.

Regardless of where the request for content originates, at step 8, the content management system 110 can provide a content item (e.g., content items 246a or 246b) in response to the request and using the association that maps the user 202 to multiple devices (e.g., from the linked anonymous identifiers 122). For example, the association can be represented by information in the row 234 that associates anonymous identifiers 232a and 232b, e.g., based on the same secret key 230a. Using this information, the content management system 110 can, for example, treat the requests for content as if they originate from the same user, regardless of the particular user device. In some implementations, identifying eligible content items for the request for content 240b, for example, can depend on content already provided to the same user 202 on the first device 106a. As a result, an advertisement for California vacations, for example, that is intended for one impression per user can be shown on the first device 106a and not repeated again on the second different device 106b. In some implementations, it can be beneficial to provide the same advertisement once and only once to each of the user's multiple devices.

Devices 106a and 106b are two examples of devices that the user 202 may use. For example, the user 202 may use a third different device 106c (e.g., a smart phone). When the user 202 uses the third different device 106c to log in, for example, the user login service 120 can store a third different anonymous identifier 232 in the linked anonymous identifiers 122. As a result, all three devices 106a-106c can be associated with the user 202, e.g., using the secret key 230a.

Similarly, other users can use the user login service 120 for logging in from multiple different devices. As a result of a second user logging into a fourth and a fifth device 106, for example, the user login service 120 can store fourth and fifth different anonymous identifiers in the linked anonymous identifiers 122 (e.g., stored in association with the second user using a secret key 230 that is different from the secret key 230a).

Figure 2F:
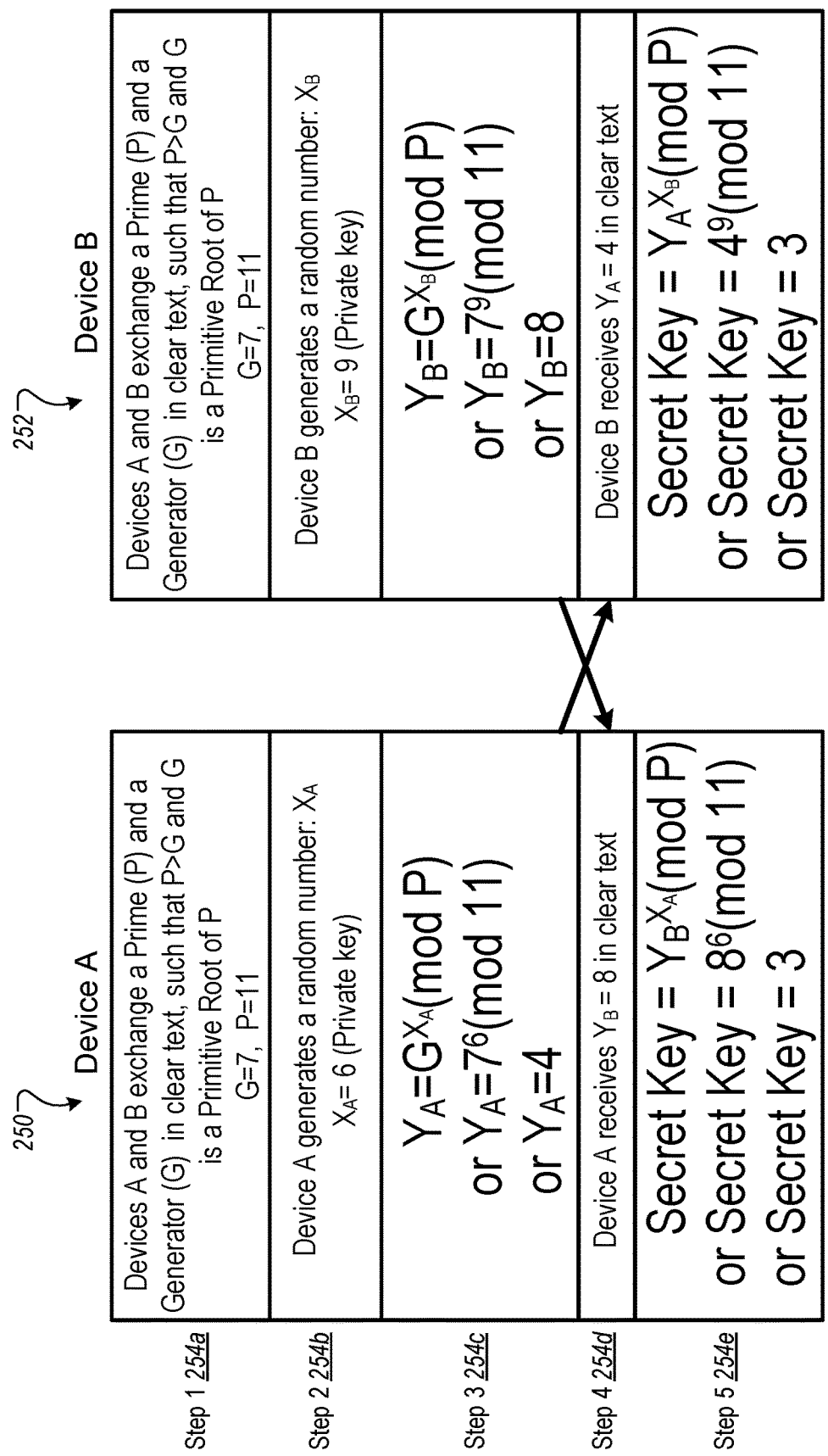
FIG. 2F shows example calculations of public, private and secret keys.

FIG. 2F shows example calculations of public, private and secret keys. Device A calculations 250 provide examples for computing a public key, a private key and a secret key on a first device, e.g., the first device 106a. Device B calculations 252 provide examples for computing a public key, a private key and a secret key on a second different device, e.g., the second different device 106b. Other methods can be used to determine public, private and secret keys.

In some implementations, the calculations can occur in steps, e.g., steps 254a-254e. For example, in step 1 254a, both devices A and B can exchange a prime P (e.g., 11) and a generator G (e.g., 7). In some implementations, the prime and generator can be stored in the user login information 121, as described above. For example, a prime and a generator that is unique to a user (and the devices associated with the user) can be determined and stored at a time that one or more entries in the user login information 121 are created and stored.

In step 2 254b, each device can generate its own private key, e.g., using a random number or in some other way. For example, device A's private key can be 6, and device B's private key can be 9. These private keys can be used in combination with at least the generator and prime from step 1 254a to determine public and private keys in the following steps.

In step 3 254c, each device can compute a public key. In some implementations, computing the public key can use a formula that includes the generator raised to the power of the device's private key, and a modulo P can be performed on the result. Using the generator, prime, and each of the devices' private keys, the resulting public keys for the devices can result in being 4 and 8, respectively.

At step 4 254d, once the public keys are determined, the devices can share their public keys, e.g., by publishing the keys in the user login information 121 as described above. As a result, device A can know device B's public key (e.g., 8), and device B can know device A's public key (e.g., 4).

At step 5 254e, secret keys can be computed, e.g., using a formula that raises the other device's public key to power of the current device's private key, and the result can undergo a modulo P (prime). As a result of the calculations, the secret key for the first and second devices can be 3. Once the secret key is determined, the value can be used by either device to update the row in the linked anonymous identifiers 122 with the device's anonymous identifier. This can be repeated for any other device associated with the same user that computes the secret key using its own private key and the public key from one of the other devices.

FIG. 2G shows an example privacy interface 256a for managing privacy rights of a user related to the delivery of content. The privacy interface 256a enables a user to review privacy options and interests. The privacy interface can be generated and managed by the privacy management system 115 (FIG. 1). For example, the privacy interface 256a can be a global privacy management interface (e.g., provided by the privacy management system 115) that is presented to the user upon user selection of an option 258a from a preference settings menu 260, or presented in some other way. In some implementations, the information presented and/or entered by the user in the privacy interface 256a (and privacy interfaces 256b-256c) can reside in user opt-out and privacy preferences 142. As such, user privacy settings are available and accessible for consideration throughout all aspects of presentation of content to the user, as described above with reference to FIGS. 1-2E.

Information presented in the privacy interface 256a can include information that is determined and/or inferred for the user based at least in part on the user's various linked cookies, e.g., using the anonymous identifier linking techniques described herein. Other techniques of linking multiple identifiers of the same user can be used, and information from those techniques can also be used in providing information for the privacy interface 256a. The privacy interface 256a can provide information related to user interest categories, demographics and linked cookie information, providing transparency to the user. This transparency enables the user to see information that may be used to personalize content presented to the user, such as advertisements that are selected and presented to the user based on the user's interests and demographics. The privacy interface 256a can also provide controls for controlling this information and use thereof.

The privacy interface 256a can present interest categories 262 (e.g., travel, sports, oceans, games) that have been determined and/or inferred for the user, e.g., from the user's multiple linked devices. For example, travel and sports interests can originate from user activities (e.g., inferred from web searches, etc.) on the user's home personal computer, interest in oceans from activities on the user's cell phone, and an inferred interest in games (e.g., from a mobile game app on the user's cell phone). In these examples, various devices, browsers and applications are different types and instances of requesting sources, each of which can have its own unique identifier. Moreover, multiple requesting sources (e.g., browsers, applications, or other cookie-generating sources) can be on the same user device.

The interest categories 262 that are presented to the user can include the interest categories associated with the respective devices (or, more generally, different requesting sources) that are currently linked. The list of interest categories can also include any particular interests that the user has explicitly added to the list, and exclude any interests that the user has elected to exclude. In some implementations, the user can change the list of interest categories at any time. For example, using a control 264a, the user can be presented with an interface through which changes can be made to the user's inferred/determined interest categories, including interest categories that the user explicitly added. Some implementations can also display, for each of the interest categories 262, the one or more anonymous identifiers (e.g., a cookie ID or other identifying information) associated with, for example, the user devices from which the interest categories 262 were determined.

Inferred demographics 266 can list various demographics (e.g., gender, age, income, etc.) that have been inferred for the user, e.g., through the anonymously-linked identifiers associated with the user. The inferred demographics 266 can also include information that the user may have explicitly provided, e.g., in user profiles, online registrations or social networks. Using a control 264b, the user can make changes to the current demographic settings, e.g., to exclude the user's gender and/or age as demographics associated with the user. For example, a user who is retired and in his 70's, but not wanting to see endless personalized ads for seniors, can use the control 264b to keep his age private. The privacy interface 256a can include other controls with which the user can see what information is known, or inferred about, the user and how that information is used (or not used). Some implementations can also display, for each of the inferred demographics 266, the one or more anonymous identifiers associated with, for example, the user devices from which the inferred demographics 266 were determined.

Interest categories 262 and inferred demographics 266 are just two types of information that can be displayed in the privacy interface 256a. Other information can also be included that may be relevant or of interest to the user. For example, the information can include the number of times that the user has been exposed to specific different advertisements over a certain time frame (e.g., fifty impressions of Brand XYZ Shoe ads over the last 30 days) or has been exposed to content from a specific source.

An information area 268 can list all the identifiers (e.g., cookies) associated with the user, where each specific identifier can be associated with a different requesting source having been used by the user to access content, including user devices, browsers and applications associated with the user. A list of anonymously linked identifiers 268a can include all of the user's currently linked identifiers, e.g., linked using anonymous identifiers as described above or linked in other ways. An explanation control 270, if selected by the user, can provide information of how identifiers are linked anonymously so that, e.g., no personally identifiable information (PII) is stored in a location not controlled by and/or private to the user. In some implementations, at any time, the user can select a control 272 to either remove one or more specific identifiers from the list (e.g., temporarily or permanently) or to unlink one or more specific identifiers. For example, a list of unlinked identifiers 268b can include the user's browser XYZ, which may be the browser that the user uses at work or in another location. For example, the user may want to unlink a browser at work, for example, so that work-related interests are not used to personalize content received at home, on a mobile device, or in a game app.

While the information area 268 provides transparency of linked identifiers, the control 272 provides the user with the ability to control the linking and use of the identifiers. For example, depending on the identifiers that the user has decided to retain in the list of anonymously linked identifiers 268a, content (e.g., advertisements, etc.) can be personalized based on user's linked devices. As a result, server systems can deliver content to the user in view of the user's current privacy selections and/or settings, and in view of the user's currently linked identifiers.

In some implementations, controls available in (or accessible from) the privacy interface 256a can allow the user to make selections and de-selections of individual interest categories and demographics on a per-identifier or global basis. For example, the user may specify that one or more interest categories or demographics are not to be used in combination with a particular identifier.

Figure 2H:
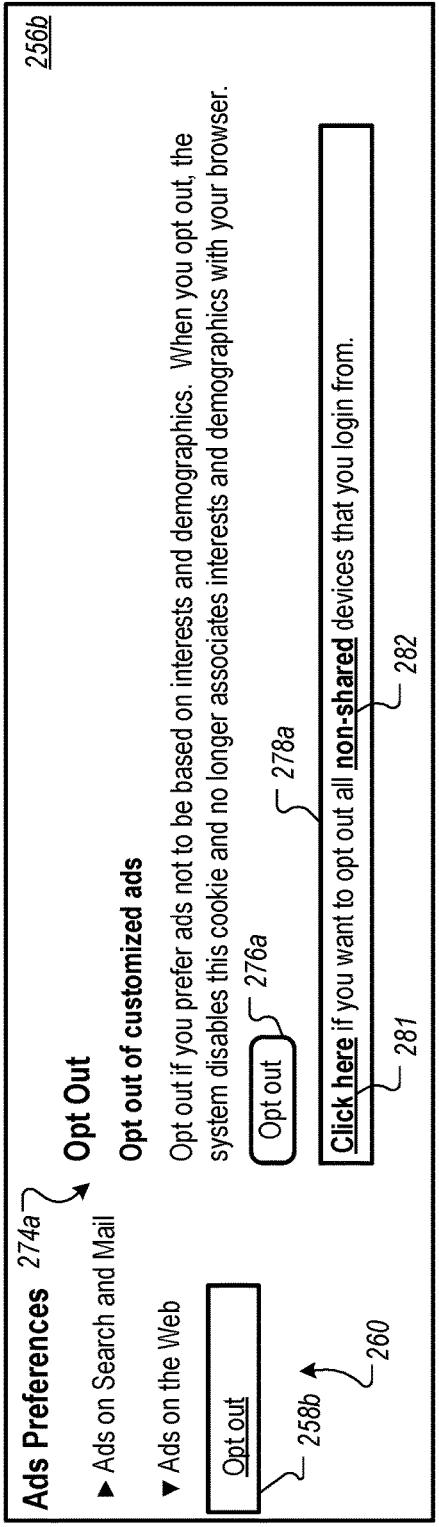
FIG. 2H shows an example privacy interface for managing privacy rights of a user related to opt out options.

FIG. 2H shows an example privacy interface 256b for managing privacy rights of a user related to opt out options. For example, the privacy interface 256b can be presented to the user upon user selection of an option 258b from the preference settings menu 260, or presented in some other way.

Information presented in the privacy interface 256b can include an explanation area 274a that describes what opting out can accomplish regarding user preferences for the presentation of personalized content (e.g., advertisements) to the user. For example, the user can select an opt out control 276a to disable the local cookie and no longer associate the user's interests (e.g., interest categories) and demographics with the user's current browser, as explained to the user by explanation box 278a. In some implementations, another control (e.g., an opt in control not shown in FIG. 2H) can be provided by which the user can reinstate the receipt of personalized content. For example, the user may decide to opt in again after noticing that advertisements are not as relevant or as interesting as they had been before opting out.

A multiple device opt out control 281 can provide a way for the user to opt out on all requesting sources (e.g., devices, browsers, applications) associated with the user. The requesting sources that are included can be displayed, for example, using a non-shared control 282. Non-shared devices are included here because public devices (e.g., shared computers at libraries) are not typically linked, and thus the use of them by the user typically would not result in the need to provide an opt out option.

Figure 2I:
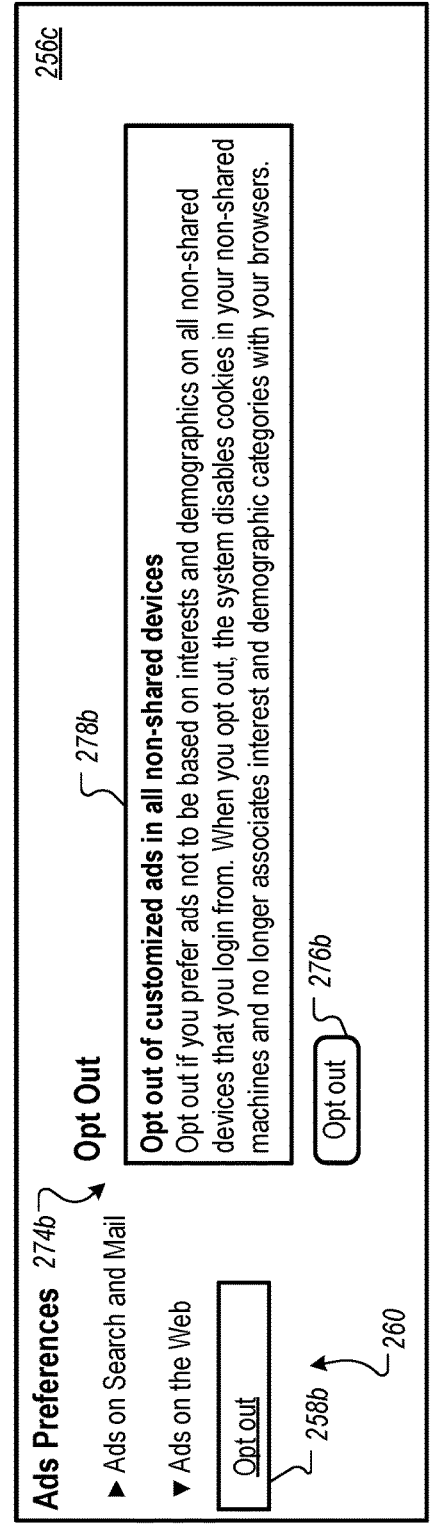
FIG. 2I shows an example privacy interface that can be presented, for example, when the user selects the multiple device opt out control.

FIG. 2I shows an example privacy interface 256c that can be presented, for example, when the user selects the multiple device opt out control 281. An explanation area 274b can describe what would be accomplished by opting out across non-shared devices. The user can select an opt out control 276b to make opting out on linked non-shared devices effective. In some implementations, another control (e.g., a multiple-device opt in control not shown in FIG. 2I) can be provided by which the user can opt back into the use of linking the user's various devices so as to receive more personalized content. For example, the user may decide to opt in again after noticing that advertisements are not as relevant or as interesting as they had been in light of the user's multiple linked devices.

Figure 2J:
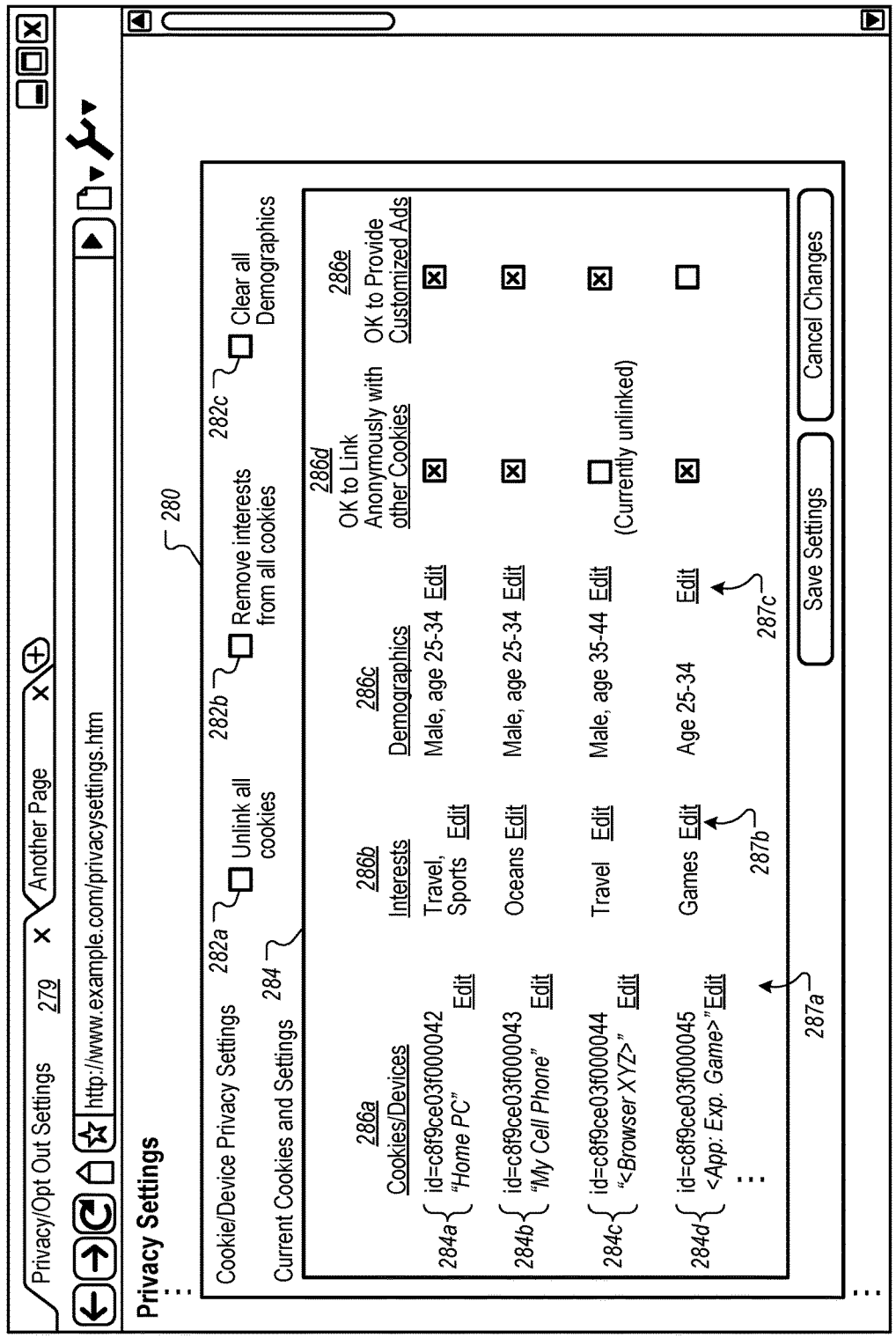
FIG. 2J shows an example privacy opt out interface for managing privacy settings for multiple devices.

FIG. 2J shows an example privacy opt out interface 279 for managing privacy settings for multiple devices, e.g., provided by the privacy management system 115. For example, the privacy opt out interface 279 can be presented to the user upon user selection of one or more controls from other privacy settings interfaces described above, or presented in some other way.

Information presented in the privacy opt out interface 279 can include a privacy settings area 280 that enables the user to view and control privacy settings for one or more devices, or to provide other settings on a per-identifier basis. In some implementations, the privacy settings area 280 can include controls 282a-282c and/or other controls that the user can use to specify privacy settings. User selections that are made using the controls 282a-282c can also affect the information and settings presented in a per-device settings area 284. In some implementations, the per-device settings area 284 can include rows 284a-284d, one for each requesting source, containing entries organized by columns, including cookies/devices 286a, interests 286b, demographics 286c, per-cookie link settings 286d and customized ads settings 286e. For example, by looking at cookies/devices 286a, the user can see, at a glance, which of the user's identifiers are known by the system in association with privacy settings (e.g., by the privacy management system 115). By looking at the interests 286b (and demographics 286c), for example, the user can see what interests (and demographics) are associated with the user, and which interests (and demographics) are associated with each identifier (e.g., cookie/device), based on row positions in the privacy settings area 280. Further, the per-cookie link settings 286d and customized ads settings 286e show the user's current settings and preferences for linking devices and allowing customized content (e.g., advertisements) to be provided based on the anonymous linking. Information in the per-device settings area 284 can be affected (e.g., updated automatically) by actions and/or settings among controls 282a-282c.

For example, the unlink control 282a can allow the user to check a single checkbox to unlink all cookies (e.g., that are linked anonymously by techniques described herein or in other ways). By checking the unlink control 282a, the user can prevent any subsequent presentation of content that may be personalized based on knowledge of the user's various linked requesting sources, including different devices, browsers, applications, etc. Unchecking the unlink control 282a can be a signal that the user permits the user's identifiers to be linked, the linking of which would then recur in stages as described above. In some implementations, checking the unlink control 282a can cause the individual per-identifier link settings 286d to become unchecked. When an identifier is unlinked, for example, it can be removed from linked anonymous identifiers 122, and/or have the linking information disabled in some other way.

A remove interests control 282b, when checked by the user for example, can remove all of the interests associated with the user's identifiers. By checking the remove interests control 282b, the user is effectively saying, "remove all current interests from my cookies and thus from consideration for providing personalized content in light of my linked cookies." Checking the remove interests control 282b can also cause the information in interests 286b to be cleared. The user can also separately change the interests for a particular device/identifier (e.g., by particular row in the per-device settings area 284) by editing the interests using a corresponding edit control 287b.

A clear demographics control 282c, when checked by the user, for example, can remove all of the demographics information associated with the user's identifiers. By checking the clear demographics control 282c, the user is effectively saying, "remove all current demographics from my cookies and thus from consideration when providing personalized content in light of my linked cookies." Checking the clear demographics control 282c can also cause the information in demographics 286c to be cleared. The user can also separately change the demographics for a particular device/identifier (e.g., a row in the per-device settings area 284) by editing the demographics using a corresponding edit control 287c. For example, the inferred age demographic for the user may be incorrect (e.g., "age 35-44" in row 284c), and the user can correct this information using the corresponding edit control 287c.

For each of the rows 284a-284d, per-identifier settings can be specified. In some implementations, edit controls 287a can be used to change displayed or other information associated with an identifier. For example, the user can change a displayed alias name (e.g., "Home PC" or "My Cell Phone") for each identifier, e.g., to label cookies for ease in managing privacy settings.

The user can check or un-check per-cookie link settings 286d to control whether specific cookies are to be linked. As shown, for example, in rows 284a, 284b and 284d, the user may want those cookies to be linked anonymously, but the user may want Browser XYZ (e.g., in row 284c) to remain unlinked.

The user can select or de-select per-identifier customized ads settings 286e, e.g., to control whether or not content to be provided to specific requesting sources (e.g., devices, browsers, applications) is selected using information associated with the linking (i.e., the content is personalized in light of current interest categories, demographics and anonymous linking of a particular cookie.

Figure 2K:
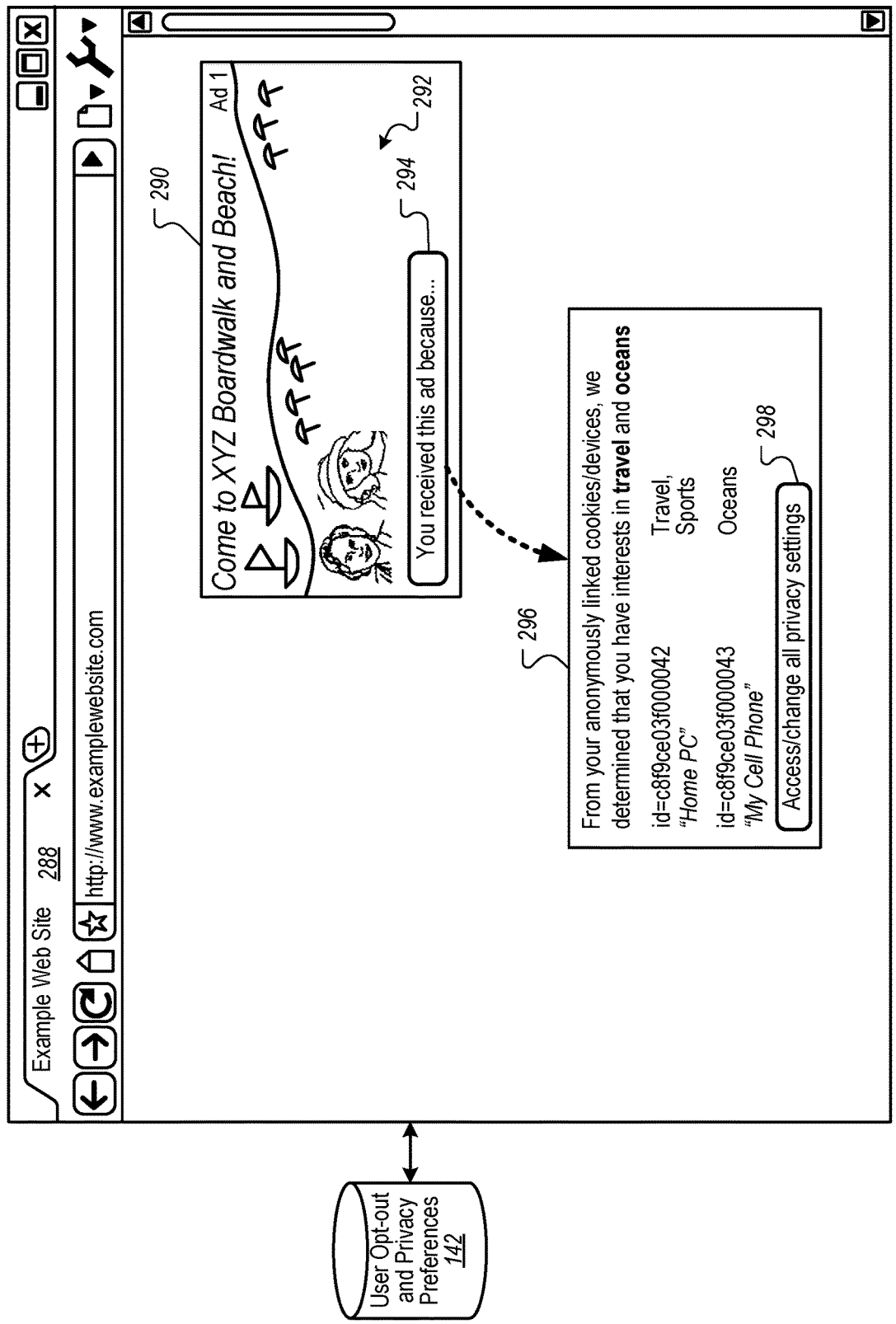
FIG. 2K shows example transparency and control features associated with a content item provided in view of a user's privacy settings.

FIG. 2K shows example transparency and control features associated with a content item provided in view of a user's privacy settings. For example, the user may be using Browser XYZ to browse content on a web page 288, and a request for content can occur to fill an advertisement slot 290. In response to the request, a content item (e.g., an advertisement 292 for an ocean-side beach resort) can be provided. For example, the content management system 110 can select the advertisement 292 based at least in part on information about linked identifiers of multiple requesting sources associated with the user. In this example, the selection of the advertisement 292 for the ocean-side beach resort can be based on all of the user's currently linked identifiers, the corresponding interests (e.g., travel, oceans) and demographics associated with the identifiers, and in light of the user's current privacy settings (e.g., obtained from user opt-out and privacy preferences 142).

In some implementations, a transparency control 294 can be provided when, for example, content is provided where selection of the content is based on, e.g., linked identifiers in accordance with the user's privacy settings. In some implementations, the transparency control 294 can provide an indication of why a particular content item was selected for presentation to a given user. For example the transparency control 294 can present a message indicating "You received this ad because . . . " or some other message. In some implementations, the transparency control 294 may not contain any text and/or may include symbols (e.g., an "I" or question mark) or a control for obtaining information. Other transparency controls can be used. In some implementations, the type of control that is presented can vary depending on how the content item was selected. For example, a different control can be displayed when multiple identifiers are used to select content vs. when just one identifier is used (i.e., the one associated with the requesting source). In some implementations, a different control can be provided that signals or informs the user that more interesting and personalized content can be provided if the user would adjust (e.g., loosen) privacy settings, while assuring the user that identifiers are linked anonymously and without storing personally identifiable information.

In some implementations, the user can manipulate (e.g., select) the transparency control 294 to reveal information about how selection of the content item was performed. For example, by clicking on the transparency control 294, the user can cause a transparency popup 296 or other display that includes information about how the content item was selected. The information can identify preference information used to determine the selection, including information that was inferred about or explicitly received from the user. The information can also include an identification of the multiple requesting sources. In the current example, the transparency popup 296 can indicate that the advertisement 292 for the ocean-side beach resort was selected based at least in part on the user's linked home PC and cell phone and interests that include travel and oceans.

In some implementations, a privacy settings control 298 can be presented to the user by which the user can change privacy settings. For example, user selection of the privacy settings control 298 can result in displaying the privacy opt out interface 279 or some other interface.

Figure 3A:
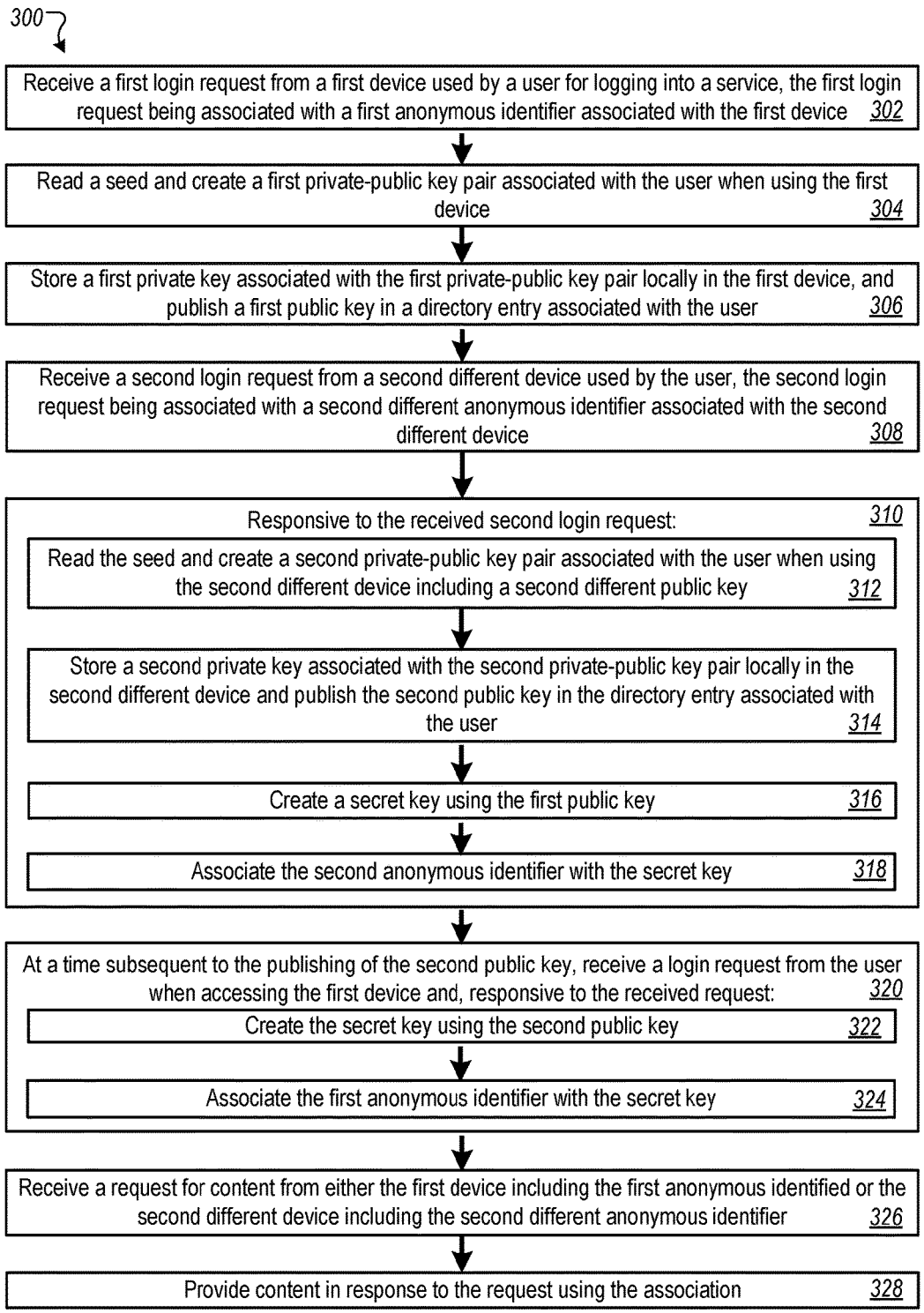
FIG. 3A is a flowchart of an example process for providing content to a user on any of multiple devices associated with the user.

FIG. 3A is a flowchart of an example process 300 for providing content to a user on any of multiple devices associated with the user. In some implementations, the content management system 110 and/or the user login service 120 can perform steps of the process 300 using instructions that are executed by one or more processors. FIGS. 1-2F are used to provide example structures for performing the steps of the process 300.

A first login request is received from a first device used by a user for logging into a service, the first login request being associated with a first anonymous identifier associated with the first device (302). For example, referring to FIG. 2A, the user login service 120 can receive the login request 208a from the first device 106a (e.g., a personal computer) being used by the user 202. The login request can be associated, for example, with the anonymous identifier 206a (e.g., "Device ID 1") that is associated with the first device 106a.

A seed is read, and a first private-public key pair is created that is associated with the user when using the first device (304). As an example, the user login service 120 can read the seed 212a (e.g., generator-prime pair 7, 11) and provide the seed 212a to the first device 106a. Using the seed, the first device 106a can determine the private key (e.g., 9) and the public key (e.g., 4) associated with first device 106a.

A first private key associated with the first private-public key pair is stored locally in the first device, and a first public key is published in a directory entry associated with the user (306). The first device 106a, for example, can store the private key in local storage 221a. The first device 106a can also provide the public key (e.g., 4) to the user login service 120 for storage in user login information 121.

A second login request is received from a second different device used by the user, the second login request being associated with a second different anonymous identifier associated with the second different device (308). As an example, referring to FIG. 2B, the same user 202 can log into the second different device (e.g., a laptop computer). The user login service 120, for example, can receive the login request 208b. The login request can be associated, for example, with the anonymous identifier 206b (e.g., "Device ID 2") that is associated with the second different device 106b.

Responsive to the received second login request (310), the seed is read, and a second private-public key pair is created that is associated with the user when using the second different device including a second different public key (312). As an example, the user login service 120 can read the seed 212a (e.g., generator-prime pair 7, 11) and provide the seed 212a to the second different device 106b. Using the seed, the second different device 106b can determine its private key (e.g., 6) and the public key (e.g., 8).

A second private key associated with the second private-public key pair is stored locally in the second different device, and the second public key is published in the directory entry associated with the user (314). The second different device 106b, for example, can store the private key in local storage 221b. The second different device 106b can also provide the public key (e.g., 8) to the user login service 120 for storage in user login information 121.

A secret key is created using the first public key (316). For example, referring to FIG. 2C, the second different device 106b can compute the secret key 230a (e.g., 3) using the public key (e.g., 4) from the first device and the second different device's own private key (e.g., 6). Device B calculations 502 shown in FIG. 2F provide example steps and formulas for computing the secret key.

The second anonymous identifier is associated with the secret key (318). For example, the second different anonymous identifier (e.g., Device ID 2) can be stored with the secret key (e.g., a hashed version), e.g., in the linked anonymous identifiers 122, which is stored separately from the user login information 121.

At a time subsequent to the publishing of the second public key, a login request is received from the user when accessing the first device (320) and, responsive to the received request, the secret key is created using the second public key (322). As an example, the user 202 can log back into the first device 106a. The login request 208a, for example, can be received by the user login service 120. At this time, the first device 106a can also compute the secret key 3 using the first device's private key (e.g., 9) and the public key (e.g., 8) from the second different device 106b.

Device A calculations 500 shown in FIG. 2F provide example steps and formulas for computing the secret key.

The first anonymous identifier is associated with the secret key (324). For example, the first anonymous identifier (e.g., Device ID 2) can be stored with hashed version of the secret key in the linked anonymous identifiers 122. As a result, both anonymous identifiers are now linked. For example, the secret key, the first anonymous identifier, and the second different anonymous identifier are stored as an entry in a table, e.g., row 234. In some implementations, the association maps the secret key to both the first and the second different anonymous identifiers. In some implementations, one or more associations can be removed (e.g., deleted from the linked anonymous identifiers 122) after expiration of a first time period (e.g., 24 hours, 48 hours, or some other time period). In some implementations, the time period can be associated with an amount of time after which the user would have been expected to have logged out from either the first device or the second different device.

A request for content is received from either the first device including the first anonymous identifier or the second different device including the second different anonymous identifier (326). In one example, referring to FIG. 2E, the content management system 110 can receive, from the first device 106a, the request for content 240a that includes the anonymous identifier Device ID 1. In another example, the content management system 110 can receive, from the second different device 106b, the request for content 240b that includes the anonymous identifier Device ID 2.

Content is provided in response to the request using the association (328). For example, depending on which device sent the request for content 240a or 240b, the content management system 110 can provide content items 246a or 246b to either the first device 106a or the second different device 106b, respectively.

In some implementations, providing content in response to the request can further include identifying the user based on the association and providing content of interest to the user. For example, information (e.g., an interest in sports) that the user has provided in a user profile (or other information provided by and/or known about the user) can be used to select content which is likely of interest to the user.

Some implementations of the process 300 can include steps for linking additional devices, e.g., a third device and/or additional devices. For example, a login request can be received from a third different device used by the user, the login request being associated with a third different anonymous identifier associated with the third different device. A third different public-private key pair can be created, including a third public key. The third private key can be stored locally on the third different device, and the third public key can be published (e.g., in the user login information 121). A secret key can be created using one of either the first public key or the second public key, in addition to the third different device's private key, e.g., using steps and formulas shown in FIG. 2F. An association between the secret key, the first anonymous identifier, the second different anonymous identifier and the third different anonymous identifier can be stored, e.g., in the linked anonymous identifiers 122. Subsequently, a request for content can be received from either the first device including the first anonymous identifier, the second different device including the second different anonymous identifier, or the third different device including the third different anonymous identifier. In response to request, content (e.g., content items 246a or 246b, or content items for the third different device) can be provided using the association.

FIG. 3B is a flowchart of an example process 340 for providing content to a user on any of multiple linked devices associated with the user. In some implementations, the content management system 110 and/or the user login service 120 can perform steps of the process 340 using instructions that are executed by one or more processors. FIGS. 1-2F are used to provide example structures for performing the steps of the process 340.

Multiple anonymous identifiers associated with a user are linked by a service using a key exchange protocol without storing personally identifiable information associated with the user in the linking (342). For example, anonymous identifiers (e.g., browser cookies, or Device IDs 1 and 2) of the first device 106a and the second different device 106b, respectively, can be linked by the user login service 120. The linking, for example, can occur using key exchange techniques described above, including using public, private and secret key calculations shown in FIG. 2E. In some implementations, public keys can be published on the user login service 120, private keys can be stored on the corresponding local device, and secret keys can be stored in a third location (e.g., linked anonymous identifiers 122). Other techniques can be used to link the devices, and more than two devices can be linked.

In some implementations, linking multiple anonymous identifiers can include receiving a login request (e.g., login requests 208a or 208b) from the user from plural different devices, determining a secret key using published public key information from another device associated with the user (where the secret key does not include any personally identifiable information associated with the user) and mapping the secret key to an anonymous identifier associated with each login request. For example, the secret key can be a secret key stored in the linked anonymous identifiers 122, which does not include information about the user that can be traced back to the user (i.e., without having access to the information from the user login information 121, the linked anonymous identifiers 122, and private keys stored on the various user devices).

In some implementations, determining the secret key can include, at each device, creating a public-private key pair, publishing a public key of the public-private key pair, and using a private key of the public-private key pair and a public key of another device to compute the secret key.

Requests for content from a client device associated with the user are received at the service, where each request includes one of the anonymous identifiers (344). For example, referring to FIG. 2E, the content management system 110 can receive the request for content 240a that includes the anonymous identifier Device ID 1 corresponding to the first device 106a. In another example, the content management system 110 can receive the request for content 240b that includes the anonymous identifier Device ID 2 corresponding to the second different device 106b.

Content associated with the user is provided that is responsive to the received requests and based on the linking (346). For example, the content management system 110 can provide content items 246a or 246b to either the first device 106a or the second different device 106b, respectively, depending on which device sent the request for content 240a or 240b.

FIG. 3C is a flowchart of an example process 360 for providing content to a user on any of multiple devices linked using public-private keys. In some implementations, the content management system 110 and/or the user login service 120 can perform steps of the process 360 using instructions that are executed by one or more processors. FIGS. 1-2F are used to provide example structures for performing the steps of the process 360.

Public-private key pairs are created for a user each time the user logs into a service from a different device including publishing respective public keys of the user in a directory entry associated with the user (362). For example, FIGS. 2A-2D show a sequence of actions that use public-private key pairs to link the first device 106a and the second different device 106b. The public keys in this example are stored in the user login information 121.

A secret key is created by each device using a public key of another device that is stored in the directory (364). For example, FIGS. 2C-2D show a sequence of actions that determine the secret key for each of the first device 106a and the second different device 106b using the public key of the other device.

The secret keys are associated with a plurality of anonymous identifiers, each anonymous identifier assigned to the user during a session associated with a respective different device (366). As an example, the secret key is stored in the linked anonymous identifiers 122. Steps and formulas for computing the secret keys are shown in FIG. 2E.

Content is provided that is associated with the user and based at least in part on the association (368). For example, depending on which device sent the request for content 240a or 240b, the content management system 110 can provide content items 246a or 246b to either the first device 106a or the second different device 106b, respectively.

Figure 3D:
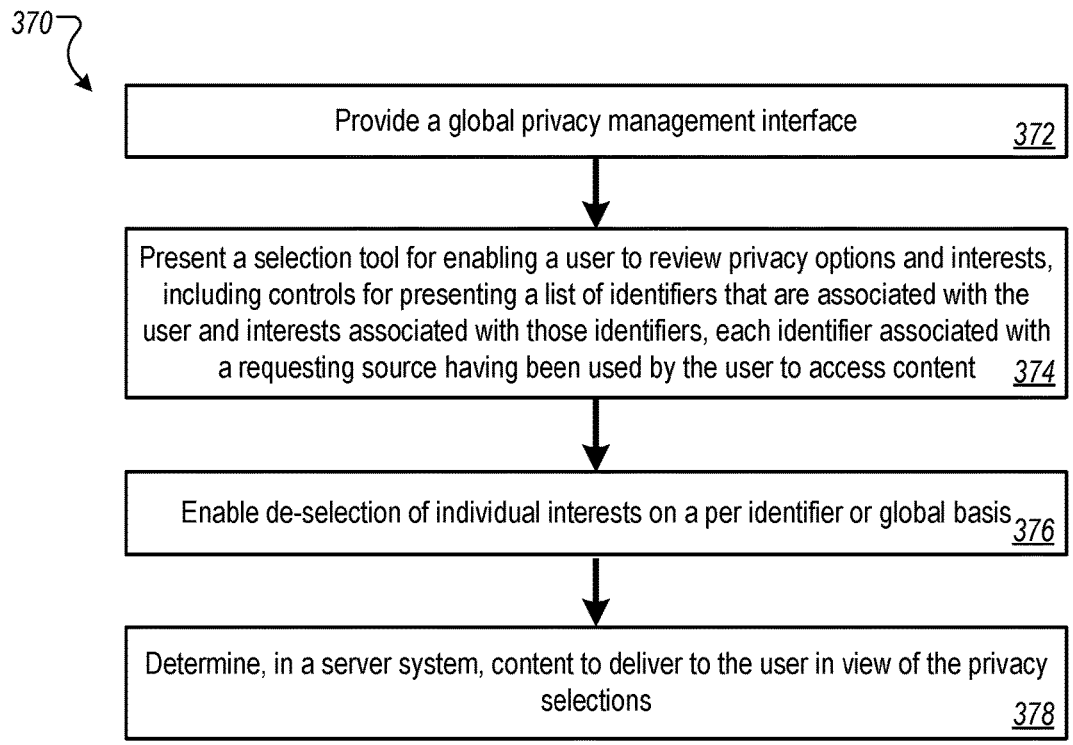
FIG. 3D is a flowchart of an example process for providing content to a user in view of privacy selections.

FIG. 3D is a flowchart of an example process 370 for providing content to a user in view of privacy selections. In some implementations, the content management system 110 and the privacy management system 115 can perform steps of the process 370 using instructions that are executed by one or more processors. FIGS. 2G-2K are used to provide example structures/interfaces associated with the steps of the process 370.

A global privacy management interface is provided (372). As an example, interfaces 256a-256c and 279 can be provided to the user, as described above.

A selection tool is presented for enabling a user to review privacy options and interests (374). Controls are included for presenting a list of identifiers that are associated with the user and interests associated with those identifiers. Each identifier is associated with a requesting source having been used by the user to access content. For example, on the interface 256a, the controls 264a and 264b can be provided by which the user can view individual identifiers and corresponding interests and demographics. Upon selection of the controls, for example, the interface 279 can be presented on which the user can make selections on a per-identifier and/or a global basis.

Some implementations can link identifiers using a Diffie-Hellman key protocol or in some other way. For example, the identifiers can be linked using a secret key derived from a seed that is unique to the user, as described above. The identifiers can include identifiers from different devices, different browsers, different applications (e.g., mobile apps and games), or other types of requesting sources.

In some implementations, the privacy options and interests can include individual categories of content that are associated with the user based on past user behavior, e.g., based on historical information for each user, including web pages visited and other actions. For example, referring to FIG. 2J, the category of "sports" that appears in the interests 286b may be determined to be an individual category associated with a user if the user has visited several sports-related web sites. When the user is presented with privacy options, each category can be associated with, and be presented along with a designator for, a particular identifier associated with the interest designation (either explicit or inferred). For example, the "sports" category is presented in row 284a, which is associated with the user's home PC. The global privacy management interface can further include controls to approve or disapprove any of the categories. For example, the user can use controls 287b to edit any interests associated with particular identifiers.

In some implementations, the controls can include one or more controls to opt in or opt out of any category or the use of any information associated with a single identifier. For example, the controls can include controls for adding additional categories to be used in the selection of content to be delivered to the user (e.g., if the user wants to designate an interest in fine art in order to make it possible to have content personalized based on that interest).

De-selection of individual interests is enabled on a per-identifier or global basis (376). As an example, the user can use controls 282a-282c to make global selections or use controls within the per-identifier settings area 280 to make per-identifier selections. For example, the user can remove individual interests for a specific device (e.g., Home PC).

In some implementations, a combined identifier can be presented to the user, such that all interests and all demographics are listed on a single row. Then the user can select a specific interest category and specify to have that interest category removed from all identifiers. Other uses of the combined identifier are possible, e.g., to make changes to demographics, unlink or link identifiers, designate that content is to be personalized based on privacy settings, and so on.

Content is determined in a server system to deliver to the user in view of the privacy selections (378). For example, the content management system 110 can provide the advertisement 292 for an ocean-side beach resort in response to a request for content to fill the content item slot 290. The selection of the advertisement 292 by the content management system 110 can depend, at least in part, on the current privacy settings for the user (e.g., from user opt-out and privacy preferences 142). For example, the serving system (e.g., content management system 110) can serve advertisements to the user based on the privacy selections that the user has made using the privacy management system 115.

In some implementations, the process 370 can further include providing a single content item privacy management interface that enables a user to manage privacy settings for a given session and related to a particular content item that is presented to the user, and determining content to deliver to the user can further include determining content to deliver to the user in view of the privacy settings. For example, the user may decide, based on content received, that privacy settings for the current device (e.g., associated with the currently executing browser or application) are to be changed.

In some implementations, the process 370 can further include creating a global privacy policy for a given user. The global privacy policy can include a mapping of a plurality of identifiers associated with the user, each identifier associated with a requesting source having been used by the user to access content. Each identifier can include session information and any enumerated preferences of the user, either inferred or explicitly defined, the preferences being used to determine content to be delivered to the user in response to received requests from the user. Creating the global privacy policy includes aggregating privacy policy information from/for each device/identifier in the plurality of identifiers to form the global privacy policy. For example, using the privacy opt out interface 279, the user can make global changes across all identifiers and/or make individual changes on a per-identifier basis, and the full set of privacy settings and user preferences can establish the user's global privacy policy.

In some implementations, session-based information can be stored in a global profile. For example, a selection of a privacy selection in association with a given session can be received from a user, and the privacy selection can be stored in association with a global policy for the user. All privacy selections received in various sessions with the user can be presented to the user, in order to present the privacy selections that are in effect in determining content to be delivered to the user by the serving system. For example, user opt-out and privacy preferences 142 can store the user's current global profile and be kept up-to-date based on any changes that the user makes over time to privacy settings.

In some implementations, a control can be presented that enables a user to un-link individual identifiers or all identifiers in a user's account, thereby allowing the user to isolate interests on a per requesting source or group of requesting sources basis. For example, the unlink control 282a, if checked, will unlink all of the user's identifiers across all requesting sources, such as the requesting sources listed in identifiers/devices 286a.

In some implementations, the user can decide to link identifiers into different linked groups. For example, the user may decide to have work-related identifiers linked together in one linked group, personal and home identifiers linked in a second linked group, and games and mobile apps linked in a third linked group.

Figure 3E:
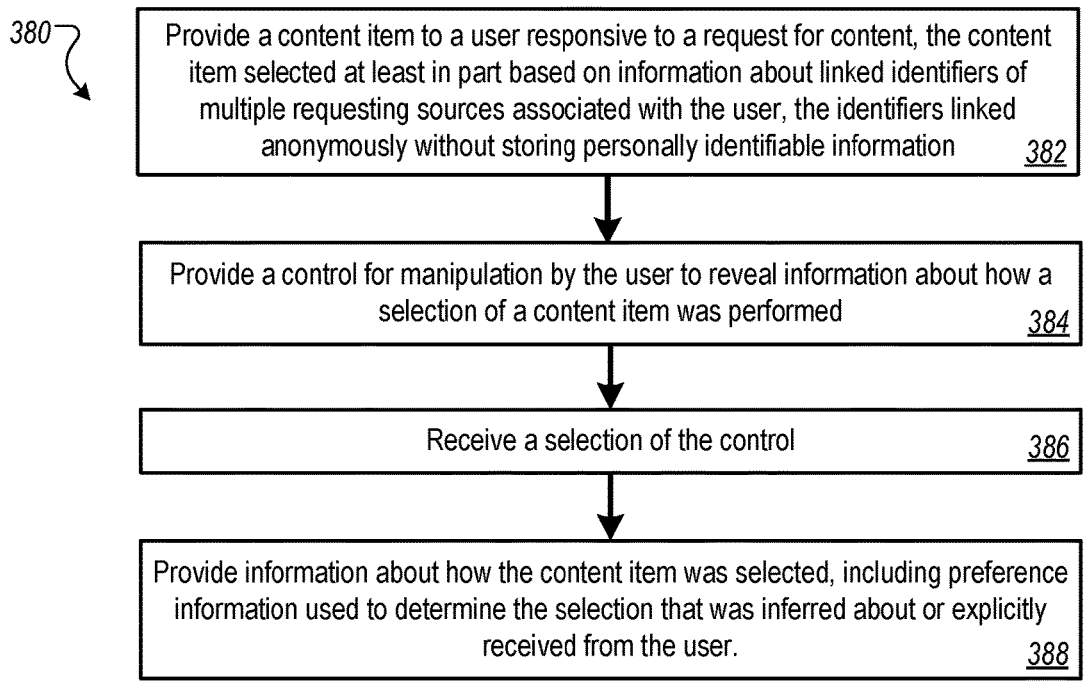
FIG. 3E is a flowchart of an example process for providing transparency regarding selection of a content item in view of a user's privacy settings.

FIG. 3E is a flowchart of an example process 380 for providing transparency regarding selection of a content item in view of a user's privacy settings. In some implementations, the content management system 110 and the privacy management system 115 can perform steps of the process 380 using instructions that are executed by one or more processors. FIG. 2K is referenced in association with the steps of the process 380.

A content item is provided to a user responsive to a request for content (382). For example, the content management system 110 can provide the advertisement 292 (e.g., an advertisement for an ocean-side beach resort) in response to a request for content received from the web page 288 to fill the advertisement slot 290.

A control is provided for manipulation by the user to reveal information about how a selection of a content item was performed (384). As an example, the transparency control 294 can be provided with the advertisement 292. In some implementations, the transparency control 294 can include an explanation (e.g., "You received this ad because . . . " or some other message) and/or other information or components.

A selection of the control is received (386). For example, the user can select the transparency control 294 in order to determine why the advertisement for the ocean-side beach resort was selected.

Responsive to the selection, information is provided to the user about how the content item was selected, including preference information used to determine the selection that was inferred about or explicitly received from the user (388). For example, after the user selects the transparency control 294, the transparency popup 296 can appear and provide information about the user's privacy settings. The information can identify the interests (e.g., travel and oceans) and the corresponding identifiers with which the interests are associated. The transparency popup 296 can also include a privacy settings control 298 that the user can select to access an interface in which privacy settings can be changed, such as an interface associated with the privacy management system 115.

Figure 4:
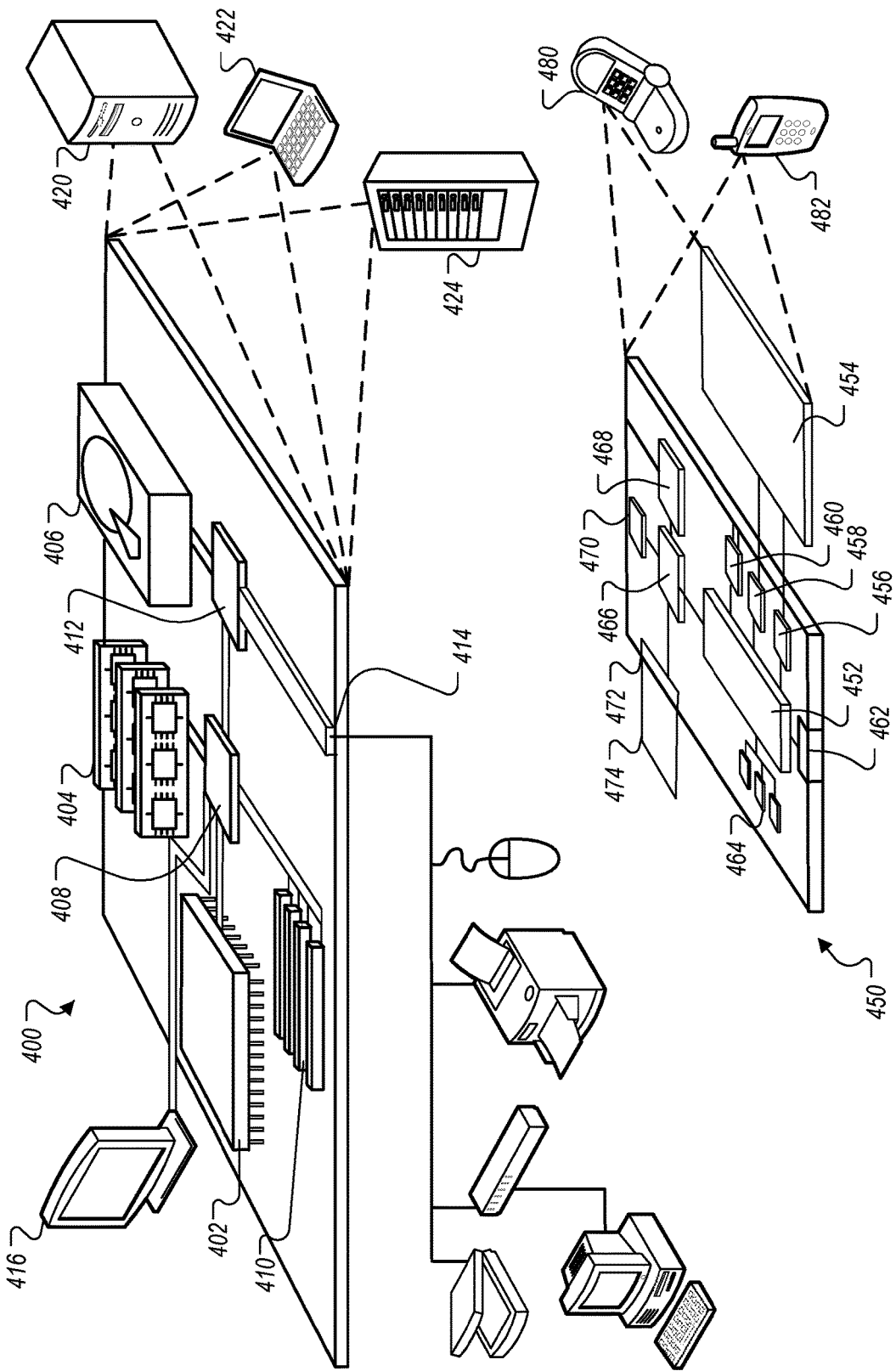
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for managing privacy rights of a user related to delivery of content, the computer-implemented method comprising:
   creating a global privacy policy for the user, the global privacy policy including a mapping of a plurality of cookies associated with the user, each cookie in the plurality of cookies associated with the user being associated with a requesting source having been used by the user to access content, wherein each cookie in the plurality of cookies associated with the user includes an identifier, session information and any enumerated preferences of the user, either inferred or explicitly defined, the enumerated preferences of the user being used to determine content to be delivered to the user in response to received requests from the user, wherein creating the global privacy policy includes aggregating privacy policy information from each cookie in the plurality of cookies associated with the user to form the global privacy policy, wherein creating the global privacy policy further includes resolving a name for the requesting source associated with a respective identifier, and wherein identifiers associated with the user are linked using a secret key derived from a seed that is unique to the user;
   providing a global privacy management interface that:
   presents a selection tool that displays privacy options and interests to the user to review, the privacy options and interests including controls for presenting a list of inferred interests that are associated with the user and an indicator for one or more devices having been used by the user to access content or perform actions that gave rise to the list of inferred interests; and
   presents a de-selection tool that displays individual interests from the list of inferred interests that are associated with the user to the user to de-select on a per-device or global basis, wherein the global privacy management interface presents the name for the requesting source when presenting privacy selections associated with at least a cookie in the plurality of cookies associated with the user; and
   determining, in a server system, content to deliver to the user in view of the privacy options and interests, and the individual interests from the list of inferred interests.

2. The method of claim 1, further comprising: providing a single content item privacy management interface that presents a selection tool to the user to manage privacy settings for a session and related to one or more particular content items that are presented to the user; and wherein determining content to deliver to the user further includes determining content to deliver to the user in view of the privacy settings.

3. The method of claim 1, wherein the privacy options and interests include individual categories of content that are associated with the user based on past user behavior, each category being associated with, and being presented along with a designator for a requesting source that is associated with an explicitly received or inferred interest and wherein the global privacy management interface further includes controls to approve or disapprove any of the categories.

4. The method of claim 3, wherein the controls to approve or disapprove any of the categories further include a control to opt in or opt out of any category or a use of any information associated with a category.

5. The method of claim 3, wherein the controls to approve or disapprove any of the categories further include controls for adding additional categories to be used in a selection of content to be delivered to the user.

6. The method of claim 1, wherein a serving system serves advertisements to the user based on the privacy options and interests.

7. The method of claim 1, further comprising: receiving, from the user, a selection of a privacy selection in association with a session;
storing the privacy selection in association with the global privacy policy for the user; and presenting, to the user, all privacy selections received in various sessions with the user that are in effect in determining content to be delivered to the user by a serving system.

8. The method of claim 1, further comprising: presenting a control to the user to un-link individual interests in a user's account, thereby allowing the user to isolate interests on a per requesting source or group of requesting sources basis.

9. The method of claim 1, wherein the identifiers are linked using a Diffie-Hellman key protocol.

10. The method of claim 1, wherein the list of inferred interests that are associated with the user are derived using cookies from different devices, different browsers or different applications.

11. A non-transitory computer-readable medium storing instructions, that when executed, cause one or more processors to perform operations including:
creating a global privacy policy for the user, the global privacy policy including a mapping of a plurality of cookies associated with the user, each cookie in the plurality of cookies associated with the user being associated with a requesting source having been used by the user to access content, wherein each cookie in the plurality of cookies associated with the user includes an identifier, session information and any enumerated preferences of the user, either inferred or explicitly defined, the enumerated preferences of the user being used to determine content to be delivered to the user in response to received requests from the user, wherein creating the global privacy policy includes aggregating privacy policy information from each cookie in the plurality of cookies associated with the user to form the global privacy policy, wherein creating the global privacy policy further includes resolving a name for the requesting source associated with a respective identifier, and wherein identifiers associated with the user are linked using a secret key derived from a seed that is unique to the user;
providing a global privacy management interface that:
presents a selection tool that displays privacy options and interests to the user to review, the privacy options and interests including controls for presenting a list of inferred interests that are associated with the user and an indicator for one or more devices having been used by the user to access content or perform actions that gave rise to the list of inferred interests; and
presents a de-selection tool that displays individual interests from the list of inferred interests that are associated with the user to the user to de-select on a per-device or global basis, wherein the global privacy management interface presents the name for the requesting source when presenting privacy selections associated with at least a cookie in the plurality of cookies associated with the user; and
determining, in a server system, content to deliver to the user in view of the privacy options and interests, and individual interests from the list of inferred interests.

12. The non-transitory computer-readable medium of claim 11, wherein the instructions cause the one or more processors to perform operations further comprising: providing a single content item privacy management interface that presents a selection tool to the user to manage privacy settings for a session and related to one or more particular content items that are presented to the user; and
wherein determining content to deliver to the user further includes determining content to deliver to the user in view of the privacy settings.

13. The non-transitory computer-readable medium of claim 11, wherein the privacy options and interests include individual categories of content that are associated with the user based on past user behavior, each category being associated with, and being presented along with a designator for a requesting source that is associated with an explicitly received or inferred interest and wherein the global privacy management interface further includes controls to approve or disapprove any of the categories.

14. The non-transitory computer-readable medium of claim 13, wherein the controls to approve or disapprove any of the categories further include a control to opt in or opt out of any category or a use of any information associated with a category.

15. The non-transitory computer-readable medium of claim 13, wherein the controls to approve or disapprove any of the categories further include controls for adding additional categories to be used in a selection of content to be delivered to the user.

16. A system comprising:
one or more processors; and
one or more memory elements including instructions that, when executed, cause the one or more processors to perform operations comprising:
creating a global privacy policy for the user, the global privacy policy including a mapping of a plurality of cookies associated with the user, each cookie in the plurality of cookies associated with the user being associated with a requesting source having been used by the user to access content, wherein each cookie in the plurality of cookies associated with the user includes an identifier, session information and any enumerated preferences of the user, either inferred or explicitly defined, the enumerated preferences of the user being used to determine content to be delivered to the user in response to received requests from the user, wherein creating the global privacy policy includes aggregating privacy policy information from each cookie in the plurality of cookies associated with the user to form the global privacy policy, wherein creating the global privacy policy further includes resolving a name for the requesting source associated with a respective identifier, and wherein identifiers associated with the user are linked using a secret key derived from a seed that is unique to the user;

providing a global privacy management interface that:

presents a selection tool that displays privacy options and interests to the user to review, the privacy options and interests including controls for presenting a list of inferred interests that are associated with the user and an indicator for one or more devices having been used by the user to access content or perform actions that gave rise to the list of inferred interests; and presents a de-selection tool that displays individual interests from the list of inferred interests that are associated with the user to the user to de-select on a per-device or global basis, wherein the global privacy management interface presents the name for the requesting source when presenting privacy selections associated with at least a cookie in the plurality of cookies associated with the user; and determining, in a server system, content to deliver to the user in view of the privacy options and interests, and the individual interest from the list of inferred interests.

17. The system of claim 16, wherein the instructions cause the one or more processors to perform operations further comprising: providing a single content item privacy management interface that presents a selection tool to the user to manage privacy settings for a session and related to one or more particular content items that are presented to the user; and wherein determining content to deliver to the user further includes determining content to deliver to the user in view of the privacy settings.

18. The system of claim 16, wherein the privacy options and interests include individual categories of content that are associated with the user based on past user behavior, each category being associated with, and being presented along with a designator for a requesting source that is associated with an explicitly received or inferred interest and wherein the global privacy management interface further includes controls to approve or disapprove any of the categories.

19. The system of claim 18, wherein the controls to approve or disapprove any of the categories further include a control to opt in or opt out of any category or a use of any information associated with a category.

20. The system of claim 18, wherein the controls to approve or disapprove any of the categories further include controls for adding additional categories to be used in a selection of content to be delivered to the user.

\* \* \* \* \*